(12) United States Patent
Kumada et al.

(10) Patent No.: US 12,362,075 B2
(45) Date of Patent: Jul. 15, 2025

(54) SINTERED BODY FOR RADIATION SHIELDING MATERIAL, RADIATION SHIELDING MATERIAL, AND METHOD FOR PRODUCING THE SAME

(71) Applicants: UNIVERSITY OF TSUKUBA, Ibaraki (JP); NATIONAL INSTITUTE OF ADVANCED INDUSTRIAL SCIENCE AND TECHNOLOGY, Tokyo (JP); DAICO MFG CO., LTD., Kyoto (JP)

(72) Inventors: Hiroaki Kumada, Ibaraki (JP);
Naoyuki Kitamura, Osaka (JP);
Tetsuyuki Nakamura, Kyoto (JP);
Takeshi Ikeda, Kyoto (JP)

(73) Assignees: DAICO MFG CO. LTD., Kyoto (JP); UNIVERSITY OF TSUKUBA, Ibaraki (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 451 days.

(21) Appl. No.: 17/407,853

(22) Filed: Aug. 20, 2021

(65) Prior Publication Data
US 2022/0336117 A1 Oct. 20, 2022

(30) Foreign Application Priority Data

Apr. 16, 2021 (JP) .................................. 2021-070029
Jul. 12, 2021 (JP) .................................. 2021-115328

(51) Int. Cl.
*G21F 1/08* (2006.01)
*C04B 35/553* (2006.01)
(Continued)

(52) U.S. Cl.
CPC .............. *G21F 1/08* (2013.01); *C04B 35/553* (2013.01); *C04B 35/6261* (2013.01);
(Continued)

(58) Field of Classification Search
CPC ..... G21F 1/08; G21F 1/06; G21F 1/02; G21F 3/02; Y02E 30/30; C04B 2235/6567;
(Continued)

(56) References Cited

U.S. PATENT DOCUMENTS

| | | | | |
|---|---|---|---|---|
| 4,025,388 A | * | 5/1977 | Jackson | ................. G21C 9/027 376/338 |
| 4,332,030 A | * | 5/1982 | Brandes | ................. G21C 7/107 376/226 |

(Continued)

FOREIGN PATENT DOCUMENTS

| | | | | |
|---|---|---|---|---|
| AU | 2018350048 A1 | * | 5/2020 | ............. A61B 6/107 |
| JP | 51-94098 | | 8/1976 | |

(Continued)

OTHER PUBLICATIONS

H. Tanaka et al., "Experimental verification of beam characteristics for cyclotron-based epithermal neutron source (C-BENS)", Applied Radiation and Isotopes, 69, pp. 1642-1645, 2011, cited in the specification.

(Continued)

*Primary Examiner* — Jason L McCormack
(74) *Attorney, Agent, or Firm* — Wenderoth, Lind & Ponack, L.L.P.

(57) ABSTRACT

As a sintered body for a radiation shielding material, which can effectively shield mainly low-energy-level neutrons, that is, thermal neutrons and lower, slow neutrons, and has excellent physical properties such as bending strength and Vickers hardness, leading to high machining strength, a sintered body for a radiation shielding material comprising (Continued)

FIG. 1555.—System LiF–CaF₂–MgF₂ (solid solutions not shown).
W. E. Roake, J. Electrochem. Soc., 104, 862 (1957). See also
V. T. Berezhnaya and G. A. Bukhalova, Zhur. Neorg. Khim., 4, 903 (1959).

LiF ranging between 99 wt. % to 5 wt. %, and one or more fluorides selected from among $MgF_2$, $CaF_2$, $AlF_3$, KF, NaF, and/or $YF_3$ ranging between 1 wt. % to 95 wt. %, having physical properties of a relative density of 92% or more, a bending strength of 50 MPa or more, and a Vickers hardness of 100 or more, is provided.

9 Claims, 7 Drawing Sheets

(51) Int. Cl.
 *C04B 35/626* (2006.01)
 *C04B 35/64* (2006.01)
(52) U.S. Cl.
 CPC ...... *C04B 35/64* (2013.01); *C04B 2235/3224* (2013.01); *C04B 2235/3409* (2013.01); *C04B 2235/445* (2013.01); *C04B 2235/5436* (2013.01); *C04B 2235/604* (2013.01); *C04B 2235/612* (2013.01); *C04B 2235/656* (2013.01); *C04B 2235/661* (2013.01)
(58) Field of Classification Search
 CPC ...... C04B 2235/6562; C04B 2235/602; C04B 2235/96; C04B 2235/95; C04B 2235/77; C04B 2235/6581; C04B 2235/658; C04B 2235/44; C04B 2235/3225; C04B 2235/3217; C04B 2235/3208; C04B 2235/3206; C04B 2235/3203; C04B 2235/3201; C04B 2235/661; C04B 2235/656; C04B 2235/612; C04B 2235/604; C04B 2235/5436; C04B 2235/445; C04B 2235/3409; C04B 2235/3224; C04B 35/553; C04B 35/6261; C04B 35/646263; C04B 35/645; C04B 35/622
 USPC ...... 250/518.1, 515.1, 516.1, 519.1
 See application file for complete search history.

(56) References Cited

U.S. PATENT DOCUMENTS

| | | | |
|---|---|---|---|
| 2016/0082282 A1* | 3/2016 | Kumada | A61N 5/10 252/478 |
| 2018/0233246 A1* | 8/2018 | Liu | A61N 5/10 |

FOREIGN PATENT DOCUMENTS

| | | |
|---|---|---|
| JP | 5112105 | 1/2013 |
| JP | 5813258 | 11/2015 |
| JP | 2018-514325 | 6/2018 |
| WO | 2018/181395 | 10/2018 |

OTHER PUBLICATIONS

M. Imoto et al., "Evaluation for activities of component of Cyclotron-Based Epithermal Neutron Source (C-BENS) and the surface of concrete wall in irradiation room", Applied Radiation and Isotopes, 69, pp. 1646-1648, 2011, cited in the specification.

Tsuyoshi Hoshino et al., "Development of Lithium Isotope Separation Technique Using Ionic Liquid Impregnated Organic Diaphragm", J. Plasma Fusion Res. vol. 89, No. 1, 3-10, 2013, together with English translation, cited in the specification.

An explanation: "Spark Plasma Sintering What's SPS", in the home page of Fuji Electronic Industrial Co., Ltd. (http://sps.fde.co.jp/jp/whatsl.html), Jun. 17, 2021, together with English translation, cited in the specification.

Masao Tokita, "Recent and Future Progress on Advanced Ceramics Sintering by Spark Plasma Sintering (SPS) Method", Ceramics Japan, vol. 49, No. 2, pp. 91-96, Feb. in 2014, together with English translation, cited in the specification.

Hiroaki Kumada et al., "Evaluation of the characteristics of the neutron beam of a linac-based neutron source for boron neutron capture therapy", Applied Radiation and Isotopes, 165, 109246, 2020, cited in the specification.

* cited by examiner

FIG. 1555.—System LiF–CaF₂–MgF₂ (solid solutions not shown).

W. E. Roake, *J. Electrochem. Soc.*, 104, 662 (1957). See also V. T. Berezhnaya and G. A. Bukhalova, *Zhur. Neorg. Khim.*, 4, 903 (1959).

Fig. 8

| | | Raw materials (wt%) | | | | | Sintering conditions, Results | | | | | | | | | | | |
|---|---|---|---|---|---|---|---|---|---|---|---|---|---|---|---|---|---|---|
| | | LiF | MgF₂ | CaF₂ | ¹⁰B [1] | ¹⁵⁷Gd [2] | Uniaxial press (MPa) | CIP (MPa) | Preliminary sintering (°C, Hr) | Primary sintering (°C, Hr) | Secondary sintering (°C, Hr) | Relative density (after secondary sintering %) | HP (°C, Hr) | Relative density (after HP %) | True density (g/cm³) | Bending strength (MPa) | Vickers hardness | Shielding material thickness leading to thermal neutron attenuation factor 1/100 (mm) | Mechanical strength evaluation | Shielding performance evaluation | Total evaluation |
| Examples | 1 | 98.8 | 0.8 | 0.4 | 0 | 0 | 20 | 20 | 400, 6 | 490, 6 | 610, 6 | 95.0 | – | – | 2.646 | 60 | 85 | 15 | ○ | ◎ | ◎ |
| | 2 | 90.0 | 6.3 | 3.7 | 0 | 0 | 20 | 20 | 400, 6 | 500, 6 | 620, 6 | 96.0 | – | – | 2.692 | 100 | 107 | 16 | ○ | ◎ | ◎ |
| | 3 | 70.0 | 18.9 | 11.1 | 0 | 0 | 20 | 20 | 400, 6 | 500, 6 | 620, 6 | 96.9 | – | – | 2.796 | 88 | 138 | 17 | ○ | ◎ | ◎ |
| | 4 | 21.0 | 49.8 | 29.2 | 0 | 0 | 20 | 20 | 400, 6 | 500, 6 | 620, 6 | 98.8 | – | – | 3.051 | 72 | 268 | 49 | ○ | ○ | ○ |
| | 5 | 9.0 | 57.3 | 33.7 | 0 | 0 | 20 | 20 | 410, 6 | 510, 6 | 630, 6 | 97.2 | – | – | 3.113 | 65 | 292 | 85 | ○ | ○ | ○ |
| | 6 | 5.3 | 59.7 | 35.0 | 0 | 0 | 20 | 20 | 420, 6 | 520, 6 | 630, 6 | 96.6 | – | – | 3.132 | 62 | 305 | 96 | ○ | ○ | ○ |
| | 7 | 70.0 | 18.9 | 11.1 | 0 | 0 | 20 | 20 | 400, 6 | 480, 6 | 610, 6 | 95.6 | – | – | 2.796 | 94 | 127 | 17 | ○ | ◎ | ◎ |
| | 8 | 70.0 | 18.9 | 11.1 | 0 | 0 | 20 | 20 | 400, 6 | 500, 6 | 610, 6 | 96.2 | – | – | do. | 95 | 133 | 17 | ○ | ◎ | ◎ |
| | 9 | 70.0 | 18.9 | 11.1 | 0 | 0 | 5.5 | 5.5 | 350, 6 | 480, 6 | 580, 6 | 93.0 | 540, 0.25 | 98.9 | do. | 105 | 144 | 16 | ○ | ◎ | ◎ |
| | 10 | 70.0 | 18.9 | 11.1 | 0.5 | 0 | 5.5 | 5.5 | 400, 6 | 500, 6 | 610, 6 | 92.4 | 570, 0.25 | 99.4 | 2.521 | 110 | 150 | 10 | ○ | ◎ | ◎ |
| | 11 | 70.0 | 18.9 | 11.1 | 1.0 | 0 | 20 | 20 | 400, 6 | 500, 6 | 640, 10 | 95.6 | – | – | 2.727 | 98 | 135 | 8 | ○ | ◎ | ◎ |
| | 12 | 70.0 | 18.9 | 11.1 | 0 | 0.52 | 20 | 20 | 400, 6 | 500, 6 | 700, 10 | 94.0 | – | – | 2.954 | 91 | 122 | 13 | ○ | ◎ | ◎ |
| | 13 | 70.0 | 18.9 | 11.1 | 0 | 1.56 | 20 | 20 | 420, 6 | 520, 6 | 700, 10 | 95.5 | – | – | 3.237 | 88 | 140 | 12 | ○ | ◎ | ◎ |
| | 14 | 5.3 | 59.7 | 35.0 | 1.5 | 0.52 | 20 | 20 | 420, 6 | 520, 6 | 700, 10 | 94.3 | – | – | 3.072 | 60 | 298 | 52 | ○ | ◎ | ◎ |
| | 15 | 9.0 | 57.3 | 33.7 | 1.5 | 0 | 20 | 20 | 420, 6 | 520, 6 | 630, 10 | 95.2 | – | – | 2.941 | 62 | 285 | 60 | ○ | ◎ | ○ |
| | 16 | 9.0 | 57.3 | 33.7 | 0 | 0.52 | 20 | 20 | 420, 6 | 520, 6 | 700, 10 | 96.0 | – | – | 3.259 | 64 | 182 | 62 | ○ | ○ | ○ |
| Comparative Examples | 1 | 3.0 | 61.1 | 35.9 | 0 | 0 | 20 | 20 | 400, 6 | 500, 6 | 630, 6 | 96.7 | – | – | 3.144 | 40 | 273 | 113 | ○ | × | × |
| | 2 | 4.5 | 60.2 | 35.3 | 0 | 0 | 20 | 20 | 400, 6 | 500, 6 | 625, 6 | 97.0 | – | – | 3.136 | 45 | 262 | 105 | ○ | × | × |
| | 3 | 91.5 | 5.4 | 3.1 | 0 | 0 | 5 | 5 | 400, 6 | 460, 6 | 560, 6 | 91.2 | – | – | 2.684 | 18 | 58 | 22 | × | ○ | × |
| | 4 | 100 | 0 | 0 | 0 | 0 | 5 | 5 | 400, 6 | 480, 6 | 560, 6 | 91.0 | – | – | 2.640 | 10 | 42 | 22 | × | ○ | × |
| | 5 | 90.0 | 6.3 | 3.7 | 0 | 0 | 4 | 4 | 400, 6 | 450, 6 | 550, 4 | 90.2 | – | – | 2.692 | –* | 52 | 25 | × | ○ | × |
| | 6 | 90.0 | 6.3 | 3.7 | 0 | 0 | 4 | 4 | 380, 6 | 460, 6 | 570, 4 | 90.7 | – | – | 2.692 | 10 | 44 | 23 | × | ○ | × |
| | 7 | 90.0 | 6.3 | 3.7 | 0 | 0 | 4 | 4 | 400, 6 | 470, 6 | 570, 8 | 91.0 | – | – | 2.692 | 12 | 58 | 22 | × | ○ | × |
| | 8 | 90.0 | 6.3 | 3.7 | 1.5 | 0 | 3 | 3 | 400, 6 | 480, 6 | 570, 8 | 89.5 | – | – | 2.583 | –* | 35 | 25 | × | ○ | × |
| | 9 | 90.0 | 6.3 | 3.7 | 0 | 0.52 | 10 | 10 | 390, 6 | 470, 6 | 630, 6 | 90.5 | – | – | 2.854 | 15 | 42 | 23 | × | ○ | × |
| Comparative material | | LiF 50wt% + PE 50wt% | | | | | – | – | – | – | – | 76.3 | – | – | 1.780 | – | – | 25 | – | ○ | – |

Notes 1), 2) ¹⁰B, ¹⁵⁷Gd concentrations added to LiF–MgF₂–CaF₂ ternary system in the outer percentage    Note 3)—* Unmeasurable

SINTERED BODY FOR RADIATION SHIELDING MATERIAL, RADIATION SHIELDING MATERIAL, AND METHOD FOR PRODUCING THE SAME

TECHNICAL FIELD

The present invention relates to a sintered body for a radiation shielding material, a radiation shielding material, and a method for producing the same, which reduces or removes low-energy radioactive rays including thermal neutrons in a radiation field containing thermal neutrons so as to make it possible to reduce radiation exposure of a human body and/or devices.

As the radiation field containing thermal neutrons, a radiation field for therapy in "Boron Neutron Capture Therapy (hereinafter, referred to as BNCT)", which is a therapy for cancer recently gaining attention, can be exemplified.

The present invention relates, more particularly, to a sintered body for a radiation shielding material, a radiation shielding material, and a method for producing the same, having a structure suitable for a radiation shielding material arranged, for example, in order to remove the types of radioactive rays such as neutrons which are unnecessary for therapy or harmful in a beam for therapy used in this BNCT, and/or to prevent the beam for therapy from leaking to the outside of a treatment area, and/or to prevent the leakage beam to the outside of the treatment area from causing a breakdown and activation of devices, and/or to prevent the leakage beam and the activation thereof from causing radiation exposure of medical staff likewise.

BACKGROUND ART

In the radiotherapy field, the development of new use wherein a radiation shielding effect and/or a radiation moderation effect of a specified element is utilized, is proceeding.

Here, "radioactive rays" related to the use of the present invention are explained. The "radioactive rays" are roughly classified into alpha ($\alpha$)-rays, beta ($\beta$)-rays, gamma ($\gamma$)-rays, X-rays, and neutron rays. These cited rays have a power passing through a substance (penetrability) gradually increasing in this order.

The neutron rays (hereinafter, referred to as neutrons) which have the highest penetrability among them are further classified into groups according to holding energy level, and there are various views concerning this classification.

For example, neutrons on the higher energy side are defined as fast neutrons, neutrons of an intermediate energy level are defined as epithermal neutrons, and neutrons on the lower energy side are defined as thermal neutrons. And in one view, the epithermal neutrons have energy of 40 keV or less, while 10 keV or less in another view.

"Japanese Society of Neutron Capture Therapy" related to the contents of the present invention defines the energy level of epithermal neutrons mainly used in the below-described neutron capture therapy as between 0.5 eV and 10 keV, that of fast neutrons on the higher energy side as more than 10 keV, and that of thermal neutrons on the lower energy side as less than 0.5 eV. Here, the energy levels defined in the guideline of the Society is conformed to.

When a normal cell is exposed to neutrons on the higher energy side, that is, fast neutrons, or $\gamma$-rays and the like generated as secondary radiations, its DNA is damaged, leading to side effects such as anemia due to radiation and leukopenia, mainly inside the body.

Furthermore, in some cases, a late injury may be caused some time after irradiation, and a tumor may be formed and bleed in the rectum or the urinary bladder.

On the other hand, when exposed to a large quantity of thermal neutrons on the lower energy side, in some cases, inflammation may be caused on the skin mainly in a beam irradiation portion or in the vicinity thereof, or some time after irradiation, side effects such as loss of hair may be caused mainly in the outer skin part, the skin and tissue beneath the skin, in the same portion.

In recent years, in order to cause the side effects and late injuries as little as possible, therapies by making use of radiation have been studied.

The feature of a neutron is that its half-life is about 15 min, being short, so that it decays in a short period of time, releases electrons and neutrinos, and turns into protons.

And the neutron has no charge, and therefore, it is easily absorbed when it collides with a nucleus.

The absorption of neutrons in such a manner is called "neutron capture", and one example of an application of neutrons to the medical care field by use of this feature is the BNCT, which is a leading-edge cancer therapy, particularly gaining attention recently.

In this BNCT, first, by causing a tumor cell such as malignant cancer to react with a boron medicine containing a boron isotope $^{10}$B injected into the body by an injection or instillation, a reaction product to be a boron compound is formed in the tumor portion.

This reaction product is then planarly irradiated with neutrons of an energy level which has less influences on a healthy part of a human body (preferably comprising mainly neutrons of an intermediate energy level such as epithermal neutrons). And a nuclear reaction with "the boron compound segregated in a high concentration in the tumor portion beforehand" is caused only within a very small area (equivalent to a cell), resulting in making only the tumor cell extinct.

Naturally, a cancer cell tends to capture boron into its tumor cell in the process of vigorous growth. In the BNCT, the therapy wherein only the tumor portion is effectively destroyed by use of this feature is conducted.

By using neutrons having less influences on the healthy part, an irradiation beam is applied in the form of a plane the size covering the tumor portion.

By this method, compared to the pinpoint irradiation in conventional radiotherapies, the irradiation time can be tremendously shortened and it is possible to cause no unirradiated portion (failure to irradiate).

Furthermore, in the usual radiotherapies, the number of times of irradiation (i.e., the number of days for therapy) is, for example, twenty or thirty, or more than one month may be required even if the irradiation is applied every day. On the other hand, the irradiation in the BNCT is applied once in principle, or twice at most, and the irradiation time at a time is thirty to sixty minutes or so, resulting in noticeable reduction of burden on a patient in the therapy.

In this BNCT, as "an irradiation beam" (neutrons) applied to an affected part of a patient, it is desired that it comprises mainly epithermal neutrons of 40 keV or less, preferably 10 keV or less, and a small quantity of low-energy-level neutrons, thermal neutrons or lower (the target value is (quantity of thermal neutrons)/(quantity of epithermal neutrons)≤(1/20)), with no fast neutrons mixed therein.

And the required number of neutrons in the neutron flux of the irradiation beam is $1\times10^9$ (n/cm$^2$ s) or more.

That is because, after irradiation, the fast neutrons in keeping the energy of fast neutrons cause damage to DNAs within cells of the body, and at the same time, they are rapidly absorbed/moderated by body fluids which are main constituents of the body (main components are water content $H_2O$ and nitrogen N) to gradually change to epithermal neutrons, and further to low-energy neutrons, thermal neutrons or lower, and in the process of energy absorption, secondary radiations such as γ-rays are generated, which cause damage to healthy cells in a similar manner to the fast neutrons.

On the one hand, the thermal neutrons generated in the absorption/moderation process react with $^{10}B$ in a boron compound administered to an affected part so as to destroy cancer cells, that is, cause a so-called neutron capture reaction. However, in cases where the secondary radiations are vigorously generated at that time, side effects are caused on healthy tissues inside the body.

On the other hand, the irradiated thermal neutrons immediately react with the outer skin tissues in the outer skin part so as to cause side effects such as inflammation of the skin or loss of hair.

As the newest system of the BNCT, a system which the group of Kyoto University, Sumitomo Heavy Industries, Ltd. et al. has been promoting is exemplified (Non-Patent Document 1 and Non-Patent Document 2).

This system consists of an apparatus for medical use only with a cyclotron accelerator exclusively used as a neutron generator, without being attached to an existing nuclear reactor.

Here, in order to lower the energy level of generated neutrons (mainly fast neutrons) to the energy level safely and easily used, it is necessary to have a moderation system with an appropriate moderation performance to lower the energy level of generated neutrons to the energy level easily used without reducing the number thereof. Specifically, it is necessary to constitute a moderator with a proper chemical composition, and to secure the shape of the moderator.

Furthermore, it is also important to prevent neutrons from leaking to the outside of the moderation system by using a shielding material having an appropriate shielding performance.

And it is still important to remove neutrons, γ-rays and the like, which are unnecessary for therapy or harmful in the therapeutic beam.

Sumitomo Heavy Industries, Ltd., mainly taking charge of the development of facilities in the group of Kyoto University et al., filed an application of the below-mentioned patent concerning "a moderation system and a moderator" for a BNCT apparatus (Patent Document 1: Japanese Patent No. 5112105).

In this Patent Document 1, as moderators in a moderation system, from the upper side of the flow direction of a neutron beam, a moderator 1 made of Pb, a moderator 2 made of Fe, a moderator 3 made of Al or $AlF_3$, and a moderator 4 made of $CaF_2$ or $CaF_2$ mixed with $AlF_3$ are used.

On the other hand, the group of University of Tsukuba, the second development group in Japan, as shown in the below-mentioned Patent Document 2 (Japanese Patent No. 5813258), uses a moderator 1 and a moderator 2, being identical with those of the Kyoto University group, a moderator 3 made of Al, and a moderator 4 made of a $MgF_2$ sintered body, as moderators of the moderation system. The moderator 4 is greatly different from that of the Kyoto University group.

In the Patent Document 1, the leakage prevention of neutrons to the outside of the moderation system is also described.

Specifically, in paragraph [0022], there is a description "at the outgoing end of the moderation system 1, a shielding material 5 is placed. The shielding material 5 has a first shielding layer 10 made of polyethylene containing LiF or high-density polyethylene, and a second shielding layer 11 made of Pb". Generally, at the outgoing end of the moderation system 1, a device referred to as "collimator" is arranged.

The first shielding layer 10 mainly plays a role to prevent the leakage of relatively-low-energy neutrons such as thermal neutrons and epithermal neutrons to the outside of the system by using mainly a substance having a large radiation absorption cross section, that is, LiF and/or polyethylene.

The second shielding layer 11, as described in the same paragraph, "mainly plays a role to shield γ-rays and the like generated from the target 2".

Problems to be Solved by the Invention

Here, what becomes a problem is constituents of the first shielding layer 10.

In the case of LiF, lithium (Li) which is the main composition element thereof has a large absorption cross section to thermal neutrons unnecessary for therapy in the main radioactive rays constituting the therapeutic beam, epithermal neutrons and thermal neutrons, as well as boron (B), cadmium (Cd), and gadolinium (Gd) among elements existing in the nature.

In naturally occurring Li (hereinafter, referred to as "natural Li"), there are two isotopes, $^6Li$ and $^7Li$. It is known that the abundance ratio (that is, "natural abundance ratio") of $^6Li$ is 7.5 atom %, while that of $^7Li$ is 92.5 atom %.

One of them, $^6Li$, has a large absorption cross section to thermal neutrons. That is a factor allowing natural Li and natural Li compounds to have high shielding performance to thermal neutrons.

Besides the above-mentioned Li, elements having a large absorption cross section to relatively-low-energy neutrons such as thermal neutrons are B, Cd, and Gd as mentioned above.

When absorbing relatively-low-energy-level neutrons as the irradiation beam in the BNCT, Li generates alpha (α)-rays as secondary radiation. The α-rays hardly do harm to the human body.

When compared to that, there is a possibility that any of B, Cd, and Gd generates γ-rays having fears of doing harm to the human body. The possibility of generation of γ-rays and the generation quantity thereof increase in the order of B, Cd, and Gd.

However, as to B, it is said that when absorbing high-energy neutrons such as fast neutrons, there is a high possibility that $^7Li$ and $^4He$, and γ-rays (0.478 MeV: this is called "prompt gamma rays" in the technical field) as secondary radiation are generated, but that when absorbing low-energy-level neutrons such as epithermal neutrons and lower, only a small quantity of γ-rays as secondary radiation are generated, while $^7Li$ and $^4He$, and α-rays doing no harm to the human body are generated.

The latter reaction ("generation of He and α-rays") is called a neutron absorption (capture) reaction by a reaction product of a medicine $^{10}B$ administered to an affected part of a patient in advance, the so-called "principle of BNCT".

In this connection, in the treatment process of the BNCT, as a method for grasping the progression of this neutron capture reaction, the above-mentioned "prompt gamma rays (0.478 MeV)" are measured for observing the field in some cases.

In this case, the mixing of the "prompt gamma rays" as secondary radiation originating in a shielding material (for example, a shielding material containing B or Gd) into the neutron beam for therapy must be avoided since it becomes a disturbance factor in the field observation.

As the isotopes of naturally occurring boron, there are $^{10}$B and $^{11}$B. The abundance ratio of each of them is 19.9 atom % and 80.1 atom % ("20 atom % and 80 atom %" in another opinion). What mainly involves the neutron absorption reaction is $^{10}$B, and the absorption cross section thereof to thermal neutrons is 3,837 barns, being large.

On the other hand, the absorption cross section of $^6$Li is 940 barns, about one quarter of that of $^{10}$B. Taking into consideration the natural abundance ratios (that of $^{10}$B is 19.9 atom %, while that of $^6$Li is 7.5 atom %), the neutron absorption performance of natural Li is lower than natural B, being about a figure down one place.

The technique of enriching $^{10}$B being an isotope of B has been already established for "an administered medicine in the BNCT" in the same field, and enriched (hereinafter, referred to as "enriched-type") $^{10}$B is on the market in Japan. The enriched-type $^{10}$B is easy to use, without a hindrance on legal regulations, because of special measures when it is used for the BNCT.

As to the isotopes of Cd, eight isotopes from $^{106}$Cd to $^{116}$Cd are known. Among them, $^{112}$Cd has an absorption cross section of 2,450 barns to thermal neutrons, being large and expected as a shielding material. The natural abundance ratio of $^{112}$Cd is 24.13 atom %.

As to the isotopes of Gd, isotopes from $^{152}$Gd to $^{160}$Gd are known. Among them, $^{157}$Gd has an absorption cross section of 254,000 barns to thermal neutrons, being extremely large and expected as a shielding material. The natural abundance ratio of $^{157}$Gd is 15.65 atom %.

It is likely to be thought that using a material made by increasing the above abundance ratio of $^6$Li, that is, a material made by enriching $^6$Li, the shielding performance can be enhanced.

For example, in paragraph [0052] of the specification of the below-mentioned Patent Document 3 (Re-publication of PCT International Publication No. 2018-181395 (Japanese Patent Application No. 2018-517656)), there is a description "The natural abundance ratio of $^7$Li is 92.5 atom %, while that of $^6$Li is 7.5 atom %. Since $^6$Li contributes to the shielding of a neutron beam, by using $^6$LiF comprising enriched $^6$Li, the neutron beam can be shielded with higher efficiency. Thus, the LiF sintered body is preferably a $^6$LiF sintered body. The $^6$LiF sintered body is explained below."

However, this enriched $^6$Li material is what can be "an initial raw material of nuclear fusion fuel for a thermonuclear bomb", and makes it possible to produce tritium which can be used for a detonator of an atomic bomb or "a raw material for a reinforced atomic bomb".

The main nuclear powers are expected to have the enrichment technique thereof, but in Japan, even for peaceful use, various kinds of regulations are applied to the development of such technique, so that enrichment of $^6$Li has not been realized.

For example, as described in Non-Patent Document 3 stating "the contents concerning Li isotope separation and enrichment techniques related to fuel for a nuclear fusion reactor" contributed by Japan Atomic Energy Agency, it is the status quo that "as to the enrichment of $^6$Li, at present, the establishment of a technique of stable mass production thereof is not attained" in Japan.

In addition, it is substantially difficult to import a raw material or products of enriched $^6$Li from foreign countries. For example, in the U.S.A. having the enrichment technique, they are goods to be regulated concerning the export to the other countries (United States Department of Commerce regulation list, classified number: 1C233).

And since it is also a problem on security to export a raw material or products of enriched $^6$Li to the other countries from Japan, they are goods to be regulated (Ministry of Economy, Trade and Industry: by "list regulation" in Ordinance of the Ministry Specifying Goods and Technologies Pursuant to Provisions of the Appended Table 1 of the Export Control Order and the Appended Table of the Foreign Exchange Order).

Thus, it can be said that it is difficult to stably secure $^6$LiF comprising enriched $^6$Li.

Consequently, when trying to obtain high shielding performance using LiF comprising natural Li having a fixed content ratio of $^6$Li, inevitably it becomes necessary to obtain a product of high density in spite of its mixing ratios including a high concentration of LiF.

However, when a starting raw material of LiF simple or other fluorides mixed with LiF of high concentration is sintered by a conventional sintering technique, LiF causes a vigorous so-called "sublimation phenomenon" at an extremely lower heating temperature than the other fluorides, and intensely vaporizes and foams in the sintering process.

Consequently, it is difficult to obtain a compact melt or sintered body from such starting raw material of LiF simple or other fluorides mixed with LiF of high concentration. Particularly, it is impossible to obtain a large-size high-density sintered body therefrom.

There is a description about the state of a sintered body made of LiF simple, for example, about the density and the like concerning a simple sintered body of LiF whose Li is $^6$Li, i.e., $^6$Li enriched-type in the Patent Document 3.

In Claim 3 of the Patent Document 3, there is a description "the $^6$LiF sintered body made of $^6$LiF, having a relative density of 83% or more and 90% or less, having a good external appearance with cracks and blisters held down on the external surface . . . ."

However, in the case of the relative density of 83% or more and 90% or less, actually, the sintered body is very easy to break in handling, and the state thereof is very similar to, for example, "the state wherein the surface layer of concrete immediately after poured into forms on-site is just starting to slightly solidify", being a very brittle sintering state.

Such brittle sintered body cannot keep its shape in handling, so that it easily loses its shape or breaks. Its quality level is unsuited to practical use.

The sintering method described in the Patent Document 3 is generally called "Spark Plasma Sintering (SPS abbreviated therefrom) method", which is known as a method suited to sintering of hard-to-sinter powder materials.

As to the sintered body obtained by the SPS method, for example, in the explanation (Non-Patent Document 4: "[Spark Plasma Sintering] What's SPS") in the home page of Fuji Electronic Industrial Co., Ltd., a manufacturer of SPS sintering apparatus, there is a description "as a phenomenon at the initial time of current-carrying, the occurrence of spark plasma accompanying pulse current-carrying/discharge . . . by sputter action as well as spark impact pressure . . . ", and in a diagram on the next page "Typical examples of materials subjected to SPS Process", "in the part of (phenomenon), the occurrence of spark impact pressure, local stress/sputter action" and "the occurrence of Joule heat, the local occurrence of high temperature" are found. The stress occurrence/local occurrence of high temperature in the sintering process is stated as a principle of this sintering method.

More concretely speaking, in a sintered body produced by the SPS method, an impact by spark plasma in the sintering process causes the occurrence of large stress, which remains within the sintered body after cooling. Therefore, the sintered body contains large residual stress.

In addition, the state of sintering progress in the sintered body is nonuniform. As a result, the sintered body by the SPS method has noticeably poor impact resistance and extremely wide variations in compactness.

In the below-mentioned Non-Patent Document 5, there is an explanation under the title of "Recent and Future Progress on Advanced Ceramics Sintering by Spark Plasma Sintering (SPS) Method". For example, in section 3.7 "Homogeneous SPS sintering technique of large-size ceramics material" on p. 95, right column therein, there are descriptions:

"Since the SPS method is characterized by quick heating/rapid sintering, "upsizing/homogeneous sintering" is a typical problem in the development of machining technique/know-how. When producing small-piece samples the size of φ 15-50 mm or less, it is comparatively easy to attain homogeneity, so that this kind of problem is hard to be revealed.

However, when producing large-size materials the size of φ 100-350 mm, variation arises. Because of thermal conductivity of the material, rearrangement of particles, uniform pressing load contact area, circumference and the like, an offset load and an unbalanced heat phenomenon easily occur, so that the rapid/homogeneous sintering is difficult . . . ."

As is the same as the Non-Patent Document 3, it is explained that by the SPS method, homogeneous sintering becomes extremely difficult when the molding size is larger.

Thus, by the SPS method, high temperatures are locally caused, so that the sintered body is hard to be uniform. And in the sintering process, stress is caused, leading to residual stress, which lowers machining strength, especially impact resistance.

As a result, the bending strength, which is an index representing impact resistance, becomes noticeably low. And in the case of having the larger size, the sintered body becomes inhomogeneous. Variation arises in density, and in machining strength, which makes it easy to partially generate a portion having low strength therein.

As described above, "high temperatures are locally caused, so that the sintering process becomes nonuniform" is a big demerit of the SPS method. Therefore, it can be said at least that it is quite unsuited to "a sintering method for compacting the mixed raw material comprising mainly LiF".

In addition, in the case of the SPS method, all the furnace material of the SPS furnace, electrodes, load press plate, and associated parts are made of high-purity carbon (carbon: the atomic symbol C). They are in the state of direct contact with the work (in this case, enriched-type $^6$LiF) all during the heating step of the sintering process.

Since LiF easily vaporizes in the sintering process, naturally carbon and vaporized F gas react so as to generate a CF-based compound. As a result, the sintered body made by the SPS method is a sintered body of pure LiF with a CF-based compound partially generated therein.

This has a substantially bad effect on the shielding performance.

Furthermore, the lower the relative density of the sintered body is, the lower the shielding performance thereof becomes. Therefore, the sintered body having such a low density as described in the Patent Document 3 has extremely low shielding performance.

Using the conventional sintering technique as described in the Patent Document 3, it is impossible to manufacture a melt or a block-formed material such as a sintered body, made of Li or containing high-concentration Li, which has a large size, is easy to handle, and has a high density and high machining strength.

Thus, the sintered body described in the Patent Document 3 has a big problem about securing of its raw material source, and its quality is at a low level quite unsuited to practical use since the relative density of the $^6$LiF sintered body is 83% or more and 90% or less, noticeably low, so that the sintered body having such low density breaks, has cracks, or sometimes loses its shape in handling.

And when taking a test piece for a test required for a machining strength examination from such low-density sintered body (concretely, cutting out a test piece using a cutting device), cracks are caused therein or it loses its shape, so that it is impossible to take a test piece to begin with. Consequently, even a strength examination cannot be conducted and values in a strength examination based on the JIS cannot be presented.

In Patent Document 4 wherein $^6$Li is used as a material for a moderation system (Japanese Translation of PCT International Application Publication No. 2018-514325, Japanese Patent Application No. 2017-557373), there are descriptions as follows.

In Claim 1 of the Patent Document 4, "the neutrons from the target are moderated to the energy range of epithermal neutrons by the moderation part (that is, "moderator"), the material of the moderation part is prepared by mixing one or a combination of multiple kinds selected from among $PbF_4$, $Al_2O_3$, $AlF_3$, $CaF_2$, or $MgF_2$ with the one or the combination of multiple kinds selected from among $PbF_4$, $Al_2O_3$, $AlF_3$, $CaF_2$, or $MgF_2$, containing $^6$Li element of 0.1-5 wt. %, the material of the moderation part is turned from a powder or a green compact to a block through a powder sintering process in a powder sintering facility, . . . ."

In Claim 2 of the Patent Document 4, "the neutrons from the target are moderated to the energy range of epithermal neutrons by the moderation part (that is, "moderator"), the material of the moderation part (that is, "moderator") consists of one or a combination of multiple kinds selected from among LiF, $Li_2CO_3$, $Al_2O_3$, $AlF_3$, $CaF_2$, or $MgF_2$, the material of the moderation part is turned from a powder or a green compact to a block through the powder sintering process in the powder sintering facility, . . . ."

Thus, both the materials of the moderator described in Claims 1 and 2 comprise components "from among . . . , $AlF_3$, $CaF_2$, or $MgF_2$, . . . ." They are not based on the component system obtained by mixing $CaF_2$ with $MgF_2$.

$^6$Li is used as a material for the moderation system therein, but as stated above, $^6$Li has naturally poor moderation performance. Though it has good performance of absorbing (that is, shielding) low-energy-level neutrons such as thermal neutrons, it has noticeably low performance of moderating high-energy-level neutrons, most of which are fast neutrons, generated at the target.

It is considered that the high-energy-level neutrons are slightly moderated by mixed compounds other than $^6$Li, and that $^6$Li exerts just its effect of shielding a small quantity of epithermal neutrons and thermal neutrons generated by the moderation.

When mixing this $^6$Li in the moderation part, the quantity of neutrons for therapy is reduced, so that it becomes difficult to secure the regulation value of the dose of neutrons for therapy ($1\times10^9$ (n/cm$^2$ s) or more is required as the dose of epithermal neutrons in the IAEA guideline). Since every BNCT development team is consecutively racking their brains over how to secure the regulation value, it must be avoided to allow $^6$Li to additionally shield neutrons in the moderation part.

Since this $^6$Li exerts the above action/effect on neutrons, this $^6$Li should be limited to a considerably low concentration when it is used in the moderation part.

However, in Examples in the Patent Document 4, the mixing ratio of $^6$Li is not clearly shown at all.

And in the Patent Document 4, "sintering conditions (such as a molded body and sintering temperature conditions)" and "the quality of the sintered body" are not clearly described. There is an extremely high possibility that the invention described in the Patent Document 4 is in violation of enablement requirement and clarity requirement.

In the Patent Document 4, the sintering method is mentioned just as "the sintering method" in the Scope of Claims. However, in the Mode for Carrying Out the Invention, two methods, "Spark Plasma Sintering" and "Hot Press Sintering", are mentioned.

In both of the methods, pressure is applied in the heat sintering process. Therefore, stress (i.e., distortion) caused by the applied pressure remains within a produced sintered body, and as a result, the sintered body becomes brittle and easy to break, even if it has a high density.

As the "shielding material for BNCT", materials having various sizes/various forms are required. And it is indispensable to machine the produced sintered bodies. The sintered bodies produced by the pressure sintering methods described in the Patent Document 4 have a low density, or even if they have a high density, distortions are caused within them, resulting in easily breaking in machining They are not suited to this use.

A rare case wherein LiF simple is sintered is described in the below-mentioned Patent Document 5 (Japanese Patent Application Laid-Open Publication No. 51-94098, Title of the Invention: Sintered Lithium Fluoride Neutron Shielding Material).

In the Patent Document 5, the size of the LiF sintered body is not described and is unclear, but it discloses that the inside diameter of the mold in the preliminary heating step is 30 mm Thereafter, the material further shrinks because of Spark Plasma Sintering under heating, so that the size thereof after sintering becomes smaller than that. It can be said that this patent relates to a method for producing an absolutely ultrasmall sintered body. In this patent, the machining strength of the sintered body is not described, being unclear.

In the Patent Document 5, a sintered body having a theoretical density of 90% or more is obtained from a raw material of a Li-based metal or compound such as Li$_2$O, LiH, Li or Li$_2$CO$_3$, including LiF by a sintering method using a sintering aid.

The size of the sintered body is not described, but in Examples, it discloses that "the starting raw material is filled into a mold having an internal volume of 100 mm×100 mm×10 mm ("10 mm" is estimated to be "the height of the mold") before sintering, and it is molded by applying a pressure of about 500 kg/cm$^2$." Since this molded body shrinks by sintering, the size of the sintered body becomes much smaller than the inside dimensions of the mold.

In the case of the small size, especially a thin sintered body, having a thickness of several mm like this case, can be easily compacted, and therefore, a high-density sintered body can be easily obtained.

When the thickness of the sintered body exceeds about 30 mm, the difference in sintering speed between the inside of the sintered body and the surface layer part thereof becomes large, and uniform compacting thereof becomes difficult. When the thickness thereof exceeds 50 mm, the compacting thereof further tends to be nonuniform and high-densification thereof becomes difficult.

On the other hand, shielding materials for BNCT in the form of a small-size thin-plate tyle (two types of 50 mm×50 mm×t10 mm and 100 mm×100 mm×t10 mm in the catalogue), named "Fukkalithium" are on the market by NIK-KATO CORPORATION.

It is estimated that the patent which these products are based on should be one relating to a sintered body of LiF applied long before by Nippon Kagaku Togyo K.K. (now NIKKATO CORPORATION) shown in the above Patent Document 5 (Japanese Patent Application Laid-Open Publication No. 51-94098, Title of the Invention "Sintered Lithium Fluoride Neutron Shielding Material").

The above current products can be admitted as shielding materials which can be used for a test apparatus using neutrons, because of their form of a small-size thin plate. However, as to the operational BNCT apparatus, for example, in the case of the apparatus of cyclotron system, just an accelerator itself on the upper side of flow thereof is large enough to fit in a room of 15 m×9 m×height 5 m or so. In addition, the room where a moderation system and an irradiation treatment system device on the lower side of flow are placed has a volume about half of the room on the upper side of flow. It is a considerably large-size apparatus.

Therefore, a shielding material having a large area is required. For example, it is actually impossible to cover a part having an area of several m×several m with combined square plates of 100 mm×100 mm.

As the shielding material for the outer regions of the moderation system, and also as a construction material of the lower end of flow of the moderation system, that is, a so-called "collimator", which is placed on the part constituting an opening (generally, called an "emitting port" or "irradiation port", a round-shaped opening having a diameter of about 100 mm to 250 mm) for emitting a neutron beam for therapy (hereinafter, referred to as a "therapeutic beam") toward an affected part of a patient, a resin made of polyethylene containing LiF is increasingly used for the reason of the above status quo.

When considering the components constituting the LiF-containing polyethylene resin, polyethylene consists of carbon C and hydrogen H, having shielding performance to high-energy fast neutrons and epithermal neutrons. It can be seen that it has noticeable shielding performance especially to fast neutrons, while little shielding performance to epithermal neutrons.

On the other hand, LiF in the LiF-containing polyethylene resin has the form of a powder. $^6$Li contained therein has excellent shielding performance to thermal neutrons, but it can only slightly shield epithermal neutrons and hardly shield fast neutrons.

The LiF powder exerts a shielding effect mainly on low-energy thermal neutrons. However, since it is dispersed all over the polyethylene resin, LiF existing in a portion where the above high-energy neutrons are just injected cannot sufficiently exert its performance.

The incident high-energy neutrons turn through epithermal neutrons into thermal neutrons by the shielding and moderating effects of the polyethylene resin. These thermal neutrons cannot be shielded by LiF until they almost reach the outgoing side.

Thus, it is impossible to allow LiF in the LiF-containing polyethylene resin to effectively exert its shielding effect on the incident side where few thermal neutrons are contained, while it becomes possible to allow it to effectively exert its effect on the outgoing side where there are many thermal neutrons generated through moderation by the polyethylene. However, in the case of too many thermal neutrons, there is a possibility that all of them cannot be shielded.

Thus, the shielding effect of LiF depends on the quantity of thermal neutrons, and in the LiF-containing polyethylene resin, it tends to be local and inefficient.

On the incident side of this LiF-containing polyethylene resin, the quantity of thermal neurons in the incident beam is small, so that the shielding of thermal neutrons by LiF is sufficient. However, the closer to the outgoing side the beam is, the more the absorption of the energy of fast neutrons by the polyethylene proceeds, so that epithermal neutrons and thermal neutrons are generated. As a result, on the outgoing side, the shielding of thermal neutrons by LiF tends to be insufficient.

Furthermore, the LiF-containing polyethylene resin is in the state of a polyethylene resin kneaded with a LiF powder. The distribution of LiF therein tends to be nonuniform, and the pore ratio therein is about 25-30 vol %, that is, a large number of bubbles are mixed therein, so that its shielding performance tends to be nonuniform.

Thus, the LiF-containing polyethylene resin has a defect of poor thermal neutron shielding performance mainly resulting from its construction, but until now, no shielding material having thermal neutron shielding performance more excellent than this is developed, so that at present, there is no choice but to use the LiF-containing polyethylene resin. Consequently, various problems are inevitably caused by neutron leakage.

As to the reactivity of LiF with neutrons, as described above, naturally, LiF has a large absorption cross section to thermal neutrons resulting from $^6Li$ contained therein, but has a small absorption cross section to neutrons of the other energy levels, for example, fast neutrons and epithermal neutrons.

Consequently, when shielding the therapeutic beam for BNCT using LiF single, thermal neutrons are shielded, while epithermal neutrons and fast neutrons are little shielded and pass through.

In other words, since epithermal neutrons suited to the therapy can pass through with little moderation, it is good for the therapy, but fast neutrons which are harmful and desired to be removed cannot be shielded and pass through therewith.

Therefore, when large quantities of fast neutrons and thermal neutrons are contained in the therapeutic beam, it is impossible to secure sufficient shielding performance only with LiF, and it becomes necessary to use another shielding material specific to fast neutrons at the same time.

Furthermore, as shown in the guideline of International Atomic Energy Agency (IAEA) regarding BNCT, the epithermal neutron strength (the number of epithermal neutrons) of the therapeutic beam in the BNCT is preferably $1\times10^9$ (n/cm$^2$ s) or more.

In association with this, leakage of beam in the peripheries of the moderation system and the beam emitting port becomes a problem, in addition to the neutron generation performance at the accelerator and the target.

When irradiating an affected part of a patient with the therapeutic beam from the BNCT apparatus, for example, the beam emitting port is located on the lower side of the beam flow through the moderator 4 of Kyoto University system in the above Patent Document 1, or the moderator 4 of University of Tsukuba system in the above Patent Document 2. If there is a gap between the affected part of the patient and it, part of the therapeutic beam leaks through this gap to the peripheries. Even a slight gap leads to leakage of a considerable quantity of neutrons, which becomes a big problem.

Thus, when the therapeutic beam leaks because of the insufficient shielding performance of the shielding layer of the outer regions of the moderation system or at the beam emitting port, or through a gap between the beam emitting port and the affected part of the patient, there is a high possibility that human or property damage is caused, such as radiation exposure of medical staff as well as patients, activation of peripheral devices and members, or treatment accuracies lowered by radiation damage to measurement devices and transmitting devices.

In order to establish a safe and stable method for therapy, it becomes an important problem to prevent these leakages.

In the BNCT apparatus, in order to remove thermal neutrons in the therapeutic beam, aiming to inhibit the occurrence of side effects in the outer skin part of the patient in therapy, a material having a performance of being able to selectively absorb and shield thermal neutrons is sometimes arranged like crossing the flow of the beam.

As materials for that, "polyethylene containing a LiF powder", "cadmium (Cd)" and "$^6Li$" are known.

As to the "polyethylene containing a LiF powder" as a material for that, as described above, LiF therein has the form of a powder, and therefore, the probability of thermal neutrons' collision with the LiF powder to be absorbed and shielded is low. Accordingly, most of the thermal neutrons pass through the layer of polyethylene surrounding the LiF powder, which has little absorbing power of thermal neutrons, resulting in insufficient thermal neutron shielding.

"Cadmium (Cd)" is a metal, and when used in the form of a plate, it is a high-density shielding material. And as described above, Cd has a large absorption coefficient of thermal neutrons and high shielding performance. However, when shielding with Cd, a large quantity of secondary radiations including γ-rays are generated, and with the generation of the large quantity of secondary radiations, the energy of the therapeutic beam passing through is greatly attenuated, so that it becomes impossible to secure a neutron flux required for the therapy.

Furthermore, since all the γ-rays harmful to the human body, generated by the shielding with Cd cannot be shielded even when placing a radiation shielding material such as Pb, the secondary radiations such as γ-rays are mixed into the therapeutic beam. That is also a problem.

When removing thermal neutrons in the therapeutic beam, a thermal neutron shielding material which generates no secondary radiation such as γ-rays should be used. Therefore, the development of a thermal neutron shielding material having excellent performance to take the place of the above-described thermal neutron shielding material is earnestly desired.

The shielding material of this type has wide-ranging uses, so that materials having various sizes and various forms are required. When the shielding material is composed of a sintered body, various kinds of machining need to be conducted on this sintered body to form a shielding material.

Therefore, such sintered body is required to have high machining strength, that is, to be compact and homogeneous, and to have few distortions, in other words, to have a high density, a high Vickers hardness and a high bending strength.

And at the finish of sintering, it is required to have the form having a large area and a sufficient thickness.

Here, once again, the finely classified uses of shielding materials used in the BNCT apparatus, a neutron irradiation apparatus for many purposes and the like, and challenges in each use are arranged and listed below.

(1) For prevention of neutron leakage from the outer regions of the moderation system (the outer regions of the moderation system include the side portion of the moderation system and the periphery of the therapeutic beam emitting port ("collimator" portion))

The form required of the shielding material to be used therein is a plate, or a block, or a tube.

The challenge is to be able to provide as large a block-formed material as possible in the phase of a sintered body, in order to make it possible to obtain a block having a large volume to some extent.

(2) For prevention of therapeutic beam leakage through a gap between the therapeutic beam emitting port and an affected part of a patient The emitting port is generally a circular opening having a diameter of 100 mm-250 mm or so (in most cases, the diameter is 100 mm-150 mm).

On the other hand, the form and size of the outer skin of the affected part of the patient greatly vary depending on where a cancer focus is.

For example, according to the head, rear neck, face, or heel, the form and size of the outer skin thereof are very different. And the form of the outer skin of the affected part varies greatly between individuals.

The beam irradiation time for one therapy is about 30-60 minutes, and the pre-treatment preparation time is additionally required before and after the irradiation time. For the patient who is forced to be at rest during at least the total time of them, the irradiation time is a period about which the patient feels "excessively long".

It must be also anticipated that the posture of the patient should be changed during the irradiation. With changing posture thereof, the gap between the beam emitting port and the affected part thereof also changes. It is not easy to efficiently shield the gap having such variously changing form using a shielding material having a fixed form.

It is expected that the form of a sintered body which is an initial material of the shielding material to be used here is a ring, or a plate having a thickness of several ten mm.

(3) For prevention of radiation exposure of control devices on the periphery of the BNCT apparatus or other radiation generators (specifically, a nuclear reactor, an accelerator other than the BNCT apparatus, etc.)

It is known that the peripheral control devices break down, for example, malfunction or stop working, when exposed to leakage radiation of high energy such as neutrons.

It is desired that the occurrence of failures due to radiation exposure of the control devices should be inhibited, but effective measures against these failures are not taken under the present conditions.

Then, it is a problem to inhibit the occurrence of failures by surrounding parts of the above devices which easily break down, the so-called "light electrical appliances, wirings" parts in the field of electrical techniques, such as a sensor, a controller part, or a wiring part, using a shielding material.

As a shielding material for this use, a material having a large area and a proper thickness in the form of a plate, a ring, or a tube is required. The challenge is to be able to provide as large a block-formed material as possible in the phase of a sintered body.

(4) Use as a thermal neutron shielding material

As described above, the irradiation beam in the BNCT apparatus consists of intermediate- and low-energy neutrons comprising mainly epithermal neutrons suited to the therapy obtained by moderating high-energy neutrons generated at the target using various moderators, and secondary radiations of various kinds generated through the process beyond the target.

Both of the neutrons other than epithermal neutrons and the secondary radiations have a risk of causing side effects and are unnecessary for the therapy. They should be removed.

As well-known thermal neutron shielding materials (thermal neutron filters), the above-mentioned material using Cd (metal) is exemplified.

Thermal neutrons can be removed using this shielding material, but a large quantity of secondary radiations such as harmful γ-rays are generated.

It is tried to remove the radiations as well as the secondary radiations already generated before reaching this shielding material using a radiation shielding material of Pb (metal), but since a large quantity of secondary radiations are generated by the shielding material (thermal neutron filter) made of Cd, the radiation shielding is insufficient and the secondary radiations remain.

As another shielding material, in the Patent Document 4, a thermal neutron filter 15 made of $^6$Li (metal) and a radiation shielding body 16 made of Pb are shown. However, as stated above, there is a security problem in use of $^6$Li.

In consideration of these situations, the challenge is to develop a thermal neutron filter having outstanding thermal neutron shielding performance, which generates substantially little secondary generations such as γ-rays harmful to the human body.

(5) Use for a neutron irradiation apparatus of "accelerator system" or "nuclear reactor system" for many purposes, using low-energy neutrons comprising mainly thermal neutrons In the case of the accelerator system, neutrons generated at a target (in most cases, the generated neutrons are "fast neutrons") are moderated by a moderator, and controlled to be neutrons of the energy level to be aimed at.

This part of the apparatus including the target and moderator is called "a moderation system". The periphery of this moderation system is surrounded with a "thermal neutron shielding material" and a "γ-ray shielding material" for leakage prevention.

However, in many cases, the shielding with both of the shielding materials placed in the surroundings of the moderation system is insufficient, resulting in the occurrence of leakage of thermal neutrons, γ-rays, and the like.

The challenge is to "shield" the thermal neutrons which leak through both of the shielding materials placed in the surroundings of the moderation system.

Laying stress on the BNCT apparatus, the problems related to shielding materials are described above. The other facilities having the same problems related to the neutron shielding materials other than the BNCT apparatus can be listed as follows:
(1) "Neutron experimental facilities" using mainly low-energy neutrons (cold neutrons to thermal neutrons),
(2) "Nuclear reactors for research",
(3) "J-PARC",
(4) "BANS in Institute of Physical and Chemical Research", and
(5) "The cyclotron system neutron experimental facility in Aomori"

Considering the above-described present situations of the development of the BNCT apparatus, the inventors of the present invention studied the development of a sintering method which makes it possible to produce a large-size agglomerated material having a high density and high machining strength, by using a fluoride-based raw material containing a high concentration of naturally occurring Li, which has excellent thermal neutron shielding performance with no security problem.

Furthermore, aiming to improve the shielding performance, they added a raw material containing boron (B) and/or gadolinium (Gd) to the fluoride-based raw material, and by using the mixed raw material, they also studied the development of a sintering method which makes it possible to produce a large-size agglomerated material having a high density and high machining strength.

As a result, they found out that the essential problems herein were the following three points.
(a) As the most necessary performance as a shielding material for radiation, particularly neutrons, first, the neutron shielding performance should be secured. In order to secure the performance, which components should be mixed, and what agglomerating conditions (particularly the density level of a sintered body) should be selected.
(b) How the machining strength of the agglomerated material (sintered body) required for obtaining a neutron shielding material is secured.
(c) How the size and form of the sintered body required for a neutron shielding material is secured.

PRIOR ART DOCUMENT

Patent Document

Patent Document 1: Japanese Patent No. 5112105
Patent Document 2: Japanese Patent No. 5813258
Patent Document 3: Re-publication of PCT International Publication No. 2018-181395 (Japanese Patent Application No. 2018-517656)
Patent Document 4: Japanese Translation of PCT International Application Publication No. 2018-514325 (Japanese Patent Application No. 2017-557373)
Patent Document 5: Japanese Patent Application Laid-Open Publication No. 51-94098

Non-Patent Document

Non-Patent Document 1: H. Tanaka et al., Applied Radiation and Isotopes 69 (2011) 1642-1645
Non-Patent Document 2: H. Tanaka et al., Applied Radiation and Isotopes 69 (2011) 1646-1648
Non-Patent Document 3: Tsuyoshi HOSHINO, J. Plasma and Fusion Res. Vol. 89, No. 1 (2013) 3-10
Non-Patent Document 4: An explanation: "Spark Plasma Sintering What's SPS" in the home page of Fuji Electronic Industrial Co., Ltd. (http://sps.fde.co.jp/jp/whats1.html)
Non-Patent Document 5: Masao TOKITA, "Recent and Future Progress on Advanced Ceramics Sintering by Spark Plasma Sintering (SPS) Method", Ceramics Japan, February in 2014, Vol. 49, No. 2, pp. 91-96
Non-Patent Document 6: H. Kumada et al., 2020. Evaluation of the characteristics of the neutron beam of a linac-based neutron source for boron neutron capture therapy. Appli. Radiat. Isot., 165, 109246

SUMMARY OF THE INVENTION

Solution to Problem and Advantageous Effect of Invention

The present invention was developed in order to solve the above problems, and it is an object of the present invention to provide a sintered body for a radiation shielding material, a radiation shielding material, and a method for producing the same, having a compact structure, high machining strength, and a size/form, which are suitable for a radiation shielding material arranged, for example, in order to remove the types of radioactive rays such as neutrons which are unnecessary for therapy or harmful in a therapeutic beam used in a BNCT apparatus, and/or to prevent this therapeutic beam from leaking to the outside of a treatment area, and/or to prevent the leakage beam to the outside of the treatment area from causing a breakdown and activation of devices, and/or to prevent the leakage beam and the activation thereof from causing radiation exposure of medical staff likewise.

Furthermore, it is another object of the present invention to provide a new "thermal neutron shielding material (thermal neutron filter)" taking the place of cadmium (Cd) which has been used for reducing or absorbing thermal neutrons in the "irradiation beam" before irradiation, in order to inhibit the occurrence of side effects in the vicinity of the outer skin of a patient through the therapy.

The "leakage radiations" are divided broadly into "leakage radiation which leaks from the moderation system (the outer regions of the moderation system and the periphery of the emitting port) to the outside thereof" and "leakage radiation which leaks out through a gap between the emitting port (collimator) and the patient", as described above.

In order to reduce the "leakage radiations", first, it is necessary to develop a "shielding material" having excellent shielding performance.

The neutrons adjusted to the therapy comprise mainly epithermal neutrons, thermal neutrons, and slow neutrons (i.e., cold neutrons), additionally containing fast neutrons and the like, left after insufficient moderation with a moderator.

A characteristic required of the "shielding material" is to have effective shielding performance to neutrons of such wide-ranging energy levels.

The source of the shielding performance, as described above, depends on the size of the absorption cross section to specified-energy-level neutrons, which particular elements or radioactive isotope elements such as a hydrogen atom, a nitrogen atom, $^{10}B$, $^{112}Cd$, and $^{157}Gd$ have.

Consequently, it is difficult to shield all of the neutrons in the wide energy range with a moderator of one kind.

Then, this time, the focus was placed on the development of a so-called "thermal neutron shielding material" which can effectively and certainly shield mainly low-energy-level neutrons, that is, thermal neutrons and the lower, slow neutrons.

As described above, Li being present in nature contains isotopes, a content ratio of 7.5 atom % of $^6$Li and that of 92.5 atom % of $^7$Li. One of them, $^6$Li, has a large absorption cross section to low-energy-level neutrons such as thermal neutrons.

In order to obtain an "excellent shielding material" by actually using $^6$Li, it is necessary to develop a method which makes it possible to stably and at a low cost produce a large-size material having a high density and high homogeneity (what the high homogeneity means is few variations in density, no residual distortion and no defect such as breaks or cracks), with machining strength secured.

The raw material thereof is required not to be a hazardous material or a toxic substance so as to have no big problem in handling, to be stable in the process of heating/agglomerating, and to have no secular change after agglomerating.

Furthermore, the block-formed material is required to have high homogeneity and secured machining strength.

The reason why the "high homogeneity" is required is because the higher the density thereof is, the higher the shielding performance thereof to radioactive rays such as neutrons becomes, and the less uneven the density thereof is, the less uneven the shielding performance thereof becomes.

Since materials having various sizes and various forms are required as the shielding material, it is essential to conduct machining on a sintered body. If residual stress remains within the sintered body, breaks or cracks are easily caused in machining.

Concerning the above-described three major problems:
(a) a requirement for securing neutron shielding performance;
(b) a requirement for securing machining strength required of a sintered body for a neutron shielding material; and
(c) a requirement for securing the size/form required of the sintered body for a neutron shielding material,
the solutions thereto were examined as follows.

Concerning the major problems (a) and (c), the shielding performance required of a shielding material to radioactive rays, especially neutrons among them, is attributed to the relationship between the density and size (concretely, the "area" and "thickness") thereof, and the shielding performance thereof, as shown in a factor analysis diagram in FIG. 2.

Specifically, it is anticipated that a shielding material for leakage prevention to the outside through moderators, which is arranged around each moderator of a moderation system, and a shielding material for prevention of bad effects of leakage radiation on a measurement device and a control device of a BNCT apparatus are required to have the form of a plate, having a large area and a large thickness to some extent.

Therefore, concerning the plate-formed shielding material, the shape-keeping performance and restriction conditions as a device other than the shielding performance are regarded as important.

It was admitted that the thickness of the sintered body was required to be several mm or more, concretely, 2 mm or more as the lower limit thereof in order to secure the shielding performance and secure the shape-keeping performance by which no break or crack is caused in handling.

It was judged that in the case of a shielding material for prevention of leakage radiation through a gap between a therapeutic beam irradiation port and an affected part of a patient, for example, the thickness thereof was preferably 100 mm or less as the upper limit thereof as a structural restriction of the BNCT apparatus, since it was admitted that when the distance from the irradiation port exceeded 100 mm, the therapeutic beam lost much energy.

However, in the case of a shielding material for leakage prevention of leakage radiation from the outer regions of the moderation system, the thickness which makes it possible to obtain the required shielding performance is strictly required, with no upper limit of the thickness of the shielding material. As a result, the restriction condition concerning the thickness of the shielding material is only the lower limit of "2 mm or more".

In order to achieve the above object, a sintered body for a radiation shielding material according to a first aspect of the present invention is characterized by comprising LiF ranging between 99 wt. % and 5 wt. %, and one or more fluorides selected from among $MgF_2$, $CaF_2$, $AlF_3$, KF, NaF, and/or $YF_3$ ranging between 1 wt. % and 95 wt. %, the sintered body having physical properties of a relative density of 92% or more, a bending strength of 50 MPa or more, and a Vickers hardness of 100 or more.

First, in order to secure the neutron shielding performance, as a main raw material, a fluoride of Li, that is, a lithium fluoride (LiF) was selected.

Generally speaking, it was difficult to sinter the LiF as a simple (equivalent to "single").

Hitherto, in most cases, with another material as a main raw material, LiF is used as a "sintering aid (which means an aid for promoting a sintering reaction)" called in the sintering technique field or an "auxiliary raw material" by making the best of its own characteristic of having a low melting point.

When sintering the raw material made of LiF simple, it vigorously vaporizes and generates a fluorine gas (causes a sublimation phenomenon) in the process of sintering, and the sintered body noticeably foams, leading to the occurrence of a big void therein.

Consequently, the sintered body has a low density, it is impossible to increase the size thereof, and the properties to be aimed at cannot be obtained. Thus, there is a limit to securing the shielding performance by relying on only the concentration of $^6$Li.

Then, the inventors of the present invention decided:
(1) to secure Li required for obtaining excellent shielding performance as a LiF raw material based on naturally occurring Li; and
(2) to select not the LiF simple but other fluorides, for example, one or more fluorides from among $MgF_2$, $CaF_2$, $AlF_3$, KF, NaF, and/or $YF_3$, which are mixed with LiF, resulting in a multicomponent fluoride sintered body, in order to stably homogeneously produce a large-size sintered body, since LiF is a typical hard-to-sinter material.

The reason why the other fluorides are selected as materials to be mixed with LiF is:
because it is considered that using fluorides belonging to the same group as LiF, a solid solution can be easily made in the sintering process, that by the occurrence of a eutectic point, the sintering temperature is lowered, leading to the restraint on a decomposition/vaporization (that is, sublimation) phenomenon of the fluorides such as LiF and the hindrance of foaming, so that a compact sintered body can be easily obtained.

The case of a LiF—$MgF_2$—$CaF_2$ ternary system made by mixing LiF with $MgF_2$ and $CaF_2$ is exemplified for explanation.

An equilibrium diagram of the LiF—MgF$_2$—CaF$_2$ ternary system is shown in FIG. 1.

In this case, the point ("point B") in the mix proportions of LiF of 59.0 mol %, (i.e., 35.7 wt. %), MgF$_2$ of 13.6 mol % (40.5 wt. %), and CaF$_2$ of 6.4 mol % (23.8 wt. %) is a eutectic point.

The melting point temperature at this point B is the lowest value in the isothermal lines indicating the melting point temperature in each mix proportion in the diagram.

This LiF—MgF$_2$—CaF$_2$ ternary system is a so-called "eutectic-type three component system equilibrium diagram". At the temperatures below the eutectic point, in all the component proportions, a solid phase, or both a solid phase and a solid solution exist.

And at the temperatures above that, entirely a liquid phase, or both a liquid phase and a solid solution exist.

When considering the sintering of the LiF simple, it is estimated from an empirical rule that "the approximate proper range of the sintering temperature in solid-phase sintering should be about 80% of the melting point of LiF (mp=847° C.), that is, about 670° C.-680° C.".

Meanwhile, the temperature at the eutectic point in the above equilibrium diagram is 672° C., which is approximately the same as the estimated proper sintering temperature of 670° C.-680° C. in the LiF simple sintering.

The proper sintering temperature (in the solid-phase sintering) in the case of this ternary system is estimated to be far lower than the eutectic point temperature (a temperature lower by 10% or more than the eutectic point temperature, from an empirical rule). Since this sintering temperature is far lower than the sintering temperature of the LiF simple, it is expected that there is a high possibility of restrained decomposition/vaporization of LiF.

In order to search mix proportions of the above three components, wherein the mix proportion of LiF is high in consideration of obtaining high shielding performance, the melting point is low, and a sintering reaction easily proceeds, the following operations were conducted.

The vertex (point A) on the lower end, 100 mol % of LiF to be a main raw material, and the eutectic point (point B) are connected with a straight line, the straight line is extended, and the point of intersection of the straight line with a line connecting the vertex of MgF$_2$ to the vertex of CaF$_2$ (ridgeline) is point C.

With varying mix proportions on this straight line connecting A to C, sintering tests were conducted. By examining the quality and feature of the test samples, the raw material mixing conditions, sintering conditions and the like suitable for this use were found out.

As a result of the tests, it was found that when the mixing ratio of LiF is about 5 wt. %-70 wt. %, it was possible to restrain the sublimation phenomenon to some extent, and restrain vigorous foaming.

However, even in a binary system sintering method, when the mixing ratio of LiF exceeded 70 wt. %, vigorous foaming was caused. In this case, the density became low, as in the case of the LiF simple raw material.

The reason why the lower limit of the mixing ratio of LiF is 5 wt. % is because the shielding performance became low in the case of below 5 wt. %, so that the sintered body was judged as being inappropriate for use as a shielding material.

The inventors of the present invention found out that when using LiF and two or more fluorides selected from among other fluorides (such as MgF$_2$, CaF$_2$, AlF$_3$, KF, NaF, and/or YF$_3$), and sintering them by a multicomponent system sintering method being ternary or more, it was possible to restrain vigorous foaming even if the mixing ratio of LiF exceeds 70 wt. %.

However, even in the multicomponent system sintering method being ternary or more, when the mixing ratio of LiF exceeded 99 wt. %, it was sometimes seen that the vaporization of F (generation of fluorine gas) due to the heat decomposition (sublimation) of LiF became intense, leading to foaming of the sintered body, and that the metallic parts and members present within the sintering furnace reacted with the fluorine gas, resulting in pollution of the inside of the sintering furnace and the sintered body.

Therefore, it was judged the LiF of 99 wt. % as the upper limit in order to restrain the heat decomposition of LiF by using more components.

In the multicomponent system sintering method being ternary or more, compared to the LiF simple, and the binary system sintering method using LiF and a fluoride selected from the other fluorides, it turned out that the eutectic reaction was promoted, that the sintering temperature was further lowered, and that vigorous foaming could be restrained as far as the mixing ratio of LiF was 99 wt. % or less.

From these test results, it was decided that as the mixing ratio of LiF, 5 wt. %-99 wt. % was a proper mixing range.

In order to allow the sintered body to exert excellent shielding performance, it is necessary to minimize what hinders the sintered body from shielding radiation, such as bubbles and voids therein.

There is no bubble or void in a sintered body in a state of true density (i.e., relative density of 100%). With increase of bubbles and voids, the relative density decreases.

The inventors of the present invention found out from the examinations that in the case of the relative density between 100% and 95% or so, the shielding performance was not so different from the case of the relative density of 100%, that in the case of about 94%, the shielding performance began to be slightly different therefrom, that in the case of about 92%, the lowered shielding performance could be seen, and that in the case of 90% or less, the shielding performance was noticeably lowered.

Therefore, it was judged that the relative density of at least 92% or more, preferably 94% or more, was required.

The relative density of a multicomponent system sintered body was calculated by multiplying the true density of each compound by its mix proportion so as to regard the sum of them (i.e., weighted mean value) as the "true density" of the multicomponent system sintered body, and dividing the "bulk density" calculated by dividing the weight of the sintered body by the bulk volume thereof, by the "true density".

For example, when the mix proportions in the ternary system sintered body on the straight line based on the above-described ternary system equilibrium diagram (FIG. 1) are LiF: 98.8 wt. %, MgF$_2$: 0.8 wt. %, and CaF$_2$: 0.4 wt. %, the true densities of each compound, LiF: 2.640 g/cm$^3$, MgF$_2$: 3.148 g/cm$^3$, and CaF$_2$: 3.180 g/cm$^3$ are multiplied by the mix proportions, respectively, and the sum of them is "2.646 g/cm$^3$".

Using the sintered body for a radiation shielding material according to the first aspect of the invention, it is possible to provide a sintered body for a radiation shielding material which contains a high concentration of Li having a large absorption cross section to neutrons, having excellent shielding performance to radioactive rays, especially low-energy neutrons.

And it is possible to provide a large-size excellent shielding material having a high density, high homogeneity, and sufficient machining strength stably at a low cost.

Therefore, it is possible to provide a sintered body for a radiation shielding material adaptable to products of various sizes and various forms.

Concerning the concentration of the isotope $^6$Li, it could be confirmed that even when the $^6$Li enriched type was sintered by the method of the present application, the sintered body had sufficient physical properties such as density and machining strength, and had far-advanced neutron shielding performance, compared to a sintered body made by using a raw material comprising naturally occurring Li. However, as stated above, the source of Li was decided from the regulations for security to be naturally occurring Li (the abundance ratio of $^6$Li in the naturally occurring Li is 7.5 atom %).

The sintered body for a radiation shielding material according to a second aspect of the present invention is characterized by the multicomponent system fluoride comprising LiF as a main phase described in the sintered body for a radiation shielding material according to the first aspect of the present invention, to which a boron compound selected from among $B_2O_3$, $B(OH)_3$, $LiB_3O_5$, or $Li_2B_4O_7$ is further added as a boron isotope $^{10}$B in the outer percentage of 0.1-5 wt. %, the sintered body having physical properties of a relative density of 92% or more, a bending strength of 40 MPa or more, and a Vickers hardness of 80 or more.

Furthermore, in the present application, a large-size excellent shielding material, containing high concentrations of Li having a large absorption cross section to neutrons and B (isotope $^{10}$B) having a larger absorption cross section thereto than Li, and having a high density, high homogeneity, and sufficient machining strength, is provided stably at a low cost.

With only the multicomponent system fluoride sintered body comprising mainly the LiF raw material based on the naturally occurring Li, the improvement of neutron shielding performance is limited. Hence, the sintered body is constituted by adding a raw material containing $^{10}$B as another substance to exhibit the shielding performance.

The abundance ratio of $^{10}$B in naturally occurring B (this is called a "natural abundance ratio" in the technical field) is 19.9 atom %, while the rest of 80.1 atom % is occupied by $^{11}$B which is a stable phase.

The reason why the boron compound is added to the multicomponent system fluoride raw material as $^{10}$B in the outer percentage of 0.1-5 wt. % is because it was confirmed by the tests that in the case of below 0.1 wt. %, the improvement of shielding performance due to the addition of the boron compound was not admitted, while in the case of above 5 wt. % of addition, the density of the sintered body was lower than a prescribed value (92% or more), and that in the case of far more than 5 wt. % of addition, the density of the sintered body further decreased, so that the sintered body became hard to keep its shape.

On the basis of the test results, the proper range of addition of the boron compound was decided to be 0.1-5 wt. %.

Using the sintered body for a radiation shielding material according to the second aspect of the present invention, since a high concentration of B (isotope $^{10}$B) having a larger absorption cross section to neutrons than Li is contained, a sintered body for a radiation shielding material having more excellent neutron shielding performance can be provided.

The sintered body for a radiation shielding material according to a third aspect of the present invention is characterized by the multicomponent system fluoride comprising LiF as a main phase described in the sintered body for a radiation shielding material according to the first aspect of the present invention, to which a gadolinium compound selected from among $Gd_2O_3$, $Gd(OH)_3$ or $GdF_3$ is further added as a gadolinium isotope $^{157}$Gd in the outer percentage of 0.1-2 wt. %, the sintered body having physical properties of a relative density of 92% or more, a bending strength of 40 MPa or more, and a Vickers hardness of 80 or more.

Furthermore, in the present application, a large-size excellent shielding material, containing high concentrations of Li having a large absorption cross section to neutrons and Gd (isotope $^{157}$Gd) having a larger absorption cross section thereto than Li, and having a high density, high homogeneity, and sufficient machining strength, is provided stably at a low cost.

The reason why the gadolinium compound is added to the multicomponent system fluoride raw material as $^{157}$Gd in the outer percentage of 0.1-2 wt. % is because it was confirmed by the tests that in the case of below 0.1 wt. %, the improvement of shielding effect due to the addition of the gadolinium compound was not admitted, while in the case of above 2 wt. % of addition, the density of the sintered body was lower than the prescribed value (92% or more), and that in the case of far more than 2 wt. % of addition, the density of the sintered body further decreased, so that the sintered body became hard to keep its shape.

On the basis of the test results, the proper range of addition of the gadolinium compound was decided to be 0.1-2 wt. %.

Using the sintered body for a radiation shielding material according to the third aspect of the present invention, since a high concentration of Gd (isotope $^{157}$Gd) having a larger absorption cross section to neutrons than Li is contained, a sintered body for a radiation shielding material having more excellent neutron shielding performance can be provided.

The sintered body for a radiation shielding material according to a fourth aspect of the present invention is characterized by the multicomponent system fluoride comprising LiF as a main phase described in the sintered body for a radiation shielding material according to the first aspect of the present invention, to which a boron compound selected from among $B_2O_3$, $B(OH)_3$, $LiB_3O_5$, or $Li_2B_4O_7$ is further added as a boron isotope $^{10}$B in the outer percentage of 0.1-5 wt. %, and a gadolinium compound selected from among $Gd_2O_3$, $Gd(OH)_3$ or $GdF_3$ is further added as a gadolinium isotope $^{157}$Gd in the outer percentage of 0.1-2 wt. %, the sintered body having physical properties of a relative density of 92% or more, a bending strength of 40 MPa or more, and a Vickers hardness of 80 or more.

Furthermore, in the present application, a large-size excellent shielding material, containing high concentrations of Li having a large absorption cross section to neutrons, and B (isotope $^{10}$B) and Gd (isotope $^{157}$Gd) each having a larger absorption cross section thereto than Li, and having a high density, high homogeneity, and sufficient machining strength, is provided stably at a low cost.

In order to allow the sintered body to obtain required shielding performance, it is desired that it has a high density, a high concentration of isotope $^6$Li, and additionally high concentrations of $^{10}$B and $^{157}$Gd.

Using the sintered body for a radiation shielding material according to the fourth aspect of the present invention, since high concentrations of B (isotope $^{10}$B) and Gd (isotope $^{157}$Gd) each having a larger absorption cross section to neutrons than Li are contained, a sintered body for a radiation shielding material having more excellent neutron shielding performance can be provided.

In order to improve the radiation shielding property, how to calculate the relative density of a multicomponent system sintered body in the case of a multicomponent system fluoride containing LiF to which a boron compound containing $^{10}$B and/or a gadolinium compound containing $^{157}$Gd is added is described below.

As the way to calculate the relative density of the sintered body, as shown by the below equation (1), the "bulk density" obtained by dividing the "mass" measured as the weight of the sintered body by the "bulk volume" calculated from the external dimensions is divided by the "true density" calculated by the below-described method.

$$\text{The relative density of the sintered body (\%)} = [\text{bulk density (g/cm}^3)] \times 100 / [\text{true density (g/cm}^3)] \quad (1)$$

Here, the value of [true density] is calculated by adding the densities of each component of the multicomponent system sintered body according to the mixing ratio of each component thereof.

When adding a boron compound containing $^{10}$B and/or a gadolinium compound containing $^{157}$Gd, the natural abundance ratios of $^{10}$B and $^{157}$Gd (the natural abundance ratio of $^{10}$B is 19.9 atom %, while that of $^{157}$Gd is 15.65 atom %), or the concentration ratio in the case of concentrated $^{10}$B is back to the initial element(s) (i.e., B, or B and Gd), the densities of each compound are added according to the addition ratio of each compound to calculate the true density.

In this regard, as described below, the values of [true density] and [relative density] calculated by the above method are expressed in each Example and Relative Example.

The sintered body for a radiation shielding material according to a fifth aspect of the present invention is characterized by the radiation, being a neutron beam in the sintered body for a radiation shielding material according to any one of the first to fourth aspects of the present invention.

Using the sintered body for a radiation shielding material according to the fifth aspect of the present invention, a sintered body for a radiation shielding material having extremely excellent neutron shielding performance can be provided.

A radiation shielding material according to a first aspect of the present invention is characterized by being formed by machining the sintered body for a radiation shielding material according to any one of the first to fifth aspects of the present invention.

In any of the above sintered bodies for a radiation shielding material, high machining strength is secured. Therefore, using the radiation shielding material according to the first aspect of the present invention, a radiation shielding material in a desired form can be easily obtained.

The radiation shielding material according to a second aspect of the present invention is characterized by being formed by machining the sintered body, having a thickness of 100 mm or less in a radiation irradiation field, the shielding material having thermal neutron shielding performance expressed as a value obtained by dividing a thermal neutron flux outgoing from the shielding material (N1) by a thermal neutron flux incident on the shielding material (N0), that is, a thermal neutron attenuation factor (N1/N0) of 1/100 or less in the radiation shielding material according to the first aspect of the present invention.

It was judged that in the case of a shielding material for prevention of leakage radiation through a gap between a therapeutic beam irradiation port and an affected part of a patient, for example, the thickness thereof was preferably 100 mm or less as a structural restriction of the BNCT apparatus, since it was admitted that when the distance from the irradiation port exceeded 100 mm, the therapeutic beam lost much energy.

Using the radiation shielding material according to the second aspect of the present invention, a radiation shielding material having excellent thermal neutron shielding performance, though it has such a small thickness that does not cause much energy loss of therapeutic beam, can be provided.

A method for producing a sintered body for a radiation shielding material according to a first aspect of the present invention is characterized by comprising the steps of:

pulverizing (primary pulverizing) individually a high-purity LiF raw material, and one or more fluoride raw materials selected from among all high-purity $MgF_2$, $CaF_2$, $AlF_3$, KF, NaF, and/or $YF_3$, so as to make each mean particle diameter 8 μm or less in median diameter, thereafter mixing the individually primary pulverized raw materials in prescribed proportions, further pulverizing (secondary pulverizing) the same so as to make the mean particle diameter 6 μm or less in median diameter, and thereafter adding pure water of 3 wt. % to the mixed raw material and kneading the same (raw material mixing step);

molding the kneaded mixed raw material at a press pressure of 5 MPa or more using a uniaxial press molding device (uniaxial press molding step);

molding the press molded article by applying a hydraulic pressure of 5 MPa or more using a cold isostatic pressing (CIP) device (CIP molding step);

conducting preliminary sintering by heating the CIP molded article in a temperature range of 350° C.-470° C. at atmospheric pressure in an air atmosphere (preliminary sintering step);

conducting sintering by heating the preliminary sintered body in a temperature range of 480° C.-560° C. at atmospheric pressure in an air atmosphere or at atmospheric pressure in an inert gas atmosphere (primary sintering step); and forming a sintered body by consecutively heating the same in a temperature range of 570° C.-800° C., at atmospheric pressure in the same atmosphere as in the preceding step (secondary sintering step).

Generally speaking, it is hard to sinter LiF as a simple.

When sintering a raw material of LiF simple, in the process of sintering, it vigorously vaporizes and generates a fluorine gas (causes a sublimation phenomenon). The sintered body vigorously foams, so that a large void is generated therein.

Consequently, the sintered body has a low density, and regarding the size thereof, it is impossible to make it larger. The property to be aimed at cannot be obtained.

The fundamental reason why LiF to be a main element leading to the shielding property is hard to sinter is because LiF easily decomposes into Li and F by heating in the sintering process, the vaporization of F proceeds, and a large number of bubbles are generated.

When carefully observing this phenomenon, it was found that the temperature at which LiF started to decompose into Li and F was relatively low. It was anticipated that depending on whether the sintering temperature is above this temperature at which the decomposition starts or below, the degree of compactness of the sintered body would be decided.

The first step of the idea of the present invention was to aim at lowering the sintering temperature through the use of a eutectic reaction in the binary system sintering method using LiF and another fluoride such as $CaF_2$ or $MgF_2$ (the binary system of fluorides which causes a eutectic point, leading to a lower sintering temperature in the binary system sintering than the sintering temperature of a simple raw material).

Then, what the inventors of the present invention devised is a sintering method, not wherein a raw material of LiF simple is sintered, but wherein a multicomponent system fluoride raw material consisting of a LiF raw material and one or more fluorides selected from among $MgF_2$, $CaF_2$, $AlF_3$, KF, NaF, and/or $YF_3$, which are fluoride-based raw materials expected to be sintered easily by mixing with the LiF raw material, is used.

As to the above-mentioned major problem (b), the securing of machining strength of a block-formed material (sintered body) required for obtaining an excellent shielding material, factors of various kinds affecting the securing of machining strength of the sintered body in the case of a shielding material whose form is optimized by machining, are controlled by mainly the density, residual stress, and mineral structure, as shown in FIG. 3.

In a situation where the density and mineral structure are good, it can be said plainly that the machining strength is decided depending on how large or small the "residual stress" is therein.

As described in the section of the Patent Document 3, the "Spark Plasma Sintering (SPS) method" causes extremely large residual stress. And there was a concern that even the "pressure sintering method such as Hot Pressing method or HIP method" might cause large residual stress, similarly to the SPS method.

As the machining strength required of the above sintered body to be used for wide-ranging purposes, the sintered body needs to have not only the "Vickers hardness" expressing one-directional compression resistance, but also the "bending strength" as an index of impact resistance.

The method which makes it easy to obtain such large-size block-formed material (sintered body) at a low cost, stably, and having such high quality as described above, is a sintering method. And in more detail, it is considered that a method wherein an atmospheric pressure sintering method is adopted as a base, and a sintered body obtained by the atmospheric pressure sintering method is further pressure sintered as necessary is preferable.

Therefore, in the present invention, at least in the primary sintering step and secondary sintering step, the atmospheric pressure sintering method is adopted.

By these studies on sintering methods, no "residual stress" within the sintered body is caused, there is no worry about the securing of machining strength, and a very stable and good sintered body can be obtained.

Using the method for producing a sintered body for a radiation shielding material according to the first aspect of the invention, a radiation shielding material, particularly an excellent shielding material to low-energy neutrons can be provided.

More specifically, a large-size block-formed material, containing a high concentration of Li having a large absorption cross section to neutrons and having a high density, can be provided stably at a low cost.

Furthermore, the sintered body for a radiation shielding material having high homogeneity, that is, little unevenness in density and extremely small residual stress, leading to the well-secured machining strength, can be provided, and the sintered body for a radiation shielding material which can be easily adapted to products of various sizes and forms, can be provided.

The method for producing a sintered body for a radiation shielding material according to a second aspect of the present invention is characterized by comprising the steps of:

pulverizing (primary pulverizing) individually a high-purity LiF raw material, one or more fluoride raw materials selected from among all high-purity $MgF_2$, $CaF_2$, $AlF_3$, KF, NaF, and/or $YF_3$, and a boron compound raw material selected from among all high-purity $B_2O_3$, $B(OH)_3$, $LiB_3O_5$ or $Li_2B_4O_7$, comprising a natural boron raw material and/or a boron raw material of enriched isotope $^{10}B$ as a boron (B) source, so as to make each mean particle diameter 8 μm or less in median diameter, thereafter mixing the individually primary pulverized raw materials in prescribed proportions, further pulverizing (secondary pulverizing) the same so as to make the mean particle diameter 6 μm or less in median diameter, and thereafter adding pure water of 3 wt. % to the mixed raw material and kneading the same (raw material mixing step); and the later steps similar to the steps of the method for producing a sintered body for a radiation shielding material in the method for producing a sintered body for a radiation shielding material according to the first aspect of the present invention.

As a raw material containing $^{10}B$, for example, (all high-purity) boron oxide ($B_2O_3$), boric acid ($B(OH)_3$), lithium borate ($LiB_3O_5$) or lithium tetraborate ($Li_2B_4O_7$) is used. Separately from the multicomponent system fluoride raw material, the boron compound containing $^{10}B$ is also pulverized to the same prescribed particle size as the multicomponent system fluoride raw material, and thereafter, added as $^{10}B$ of 0.1-5 wt. % (that is, the boron compound as $^{10}B$ of 0.1-5 wt. % in terms of outer percentage is added to the multicomponent system fluoride raw material). They are mixed for a prescribed period of time, and further pulverized. A prescribed quantity of pure water is added to this mixed raw material powder and kneaded for a prescribed period of time, resulting in a starting raw material.

The reason why the multicomponent system fluoride raw material and the boron compound are separately pulverized once, and thereafter mixed and further pulverized, is because in the preliminarily conducted pulverizing tests of raw materials, it was confirmed that each raw material was differently pulverized.

When boron (B) is added to the multicomponent system fluoride raw material, there is no technical problem in using the $^{10}B$ enriched type, and it can be also used in the sintering method of the present application.

As the boron medicine previously administered to a patient immediately before therapy in the BNCT, the $^{10}B$ enriched type is used in any case. This use for the BNCT is free from the regulations for security since before, and there is no hitch in use thereof.

In Examples of the present application, the $^{10}B$ enriched type was used in just one example. In consideration of exporting the products abroad, in all the other examples of boron addition, a raw material of naturally occurring boron was used.

Using the method for producing a sintered body for a radiation shielding material according to the second aspect of the present invention, since a high concentration of B (isotope $^{10}$B) having a larger absorption cross section to neutrons than Li is contained, a sintered body for a radiation shielding material having more excellent neutron shielding performance can be provided.

The method for producing a sintered body for a radiation shielding material according to a third aspect of the present invention is characterized by comprising the steps of:

pulverizing (primary pulverizing) individually a high-purity LiF raw material, one or more fluoride raw materials selected from among all high-purity $MgF_2$, $CaF_2$, $AlF_3$, KF, NaF, and/or $YF_3$, and a gadolinium compound raw material selected from among all high-purity $Gd_2O_3$, $Gd(OH)_3$ or $GdF_3$, comprising a natural gadolinium raw material as a gadolinium (Gd) source, so as to make each mean particle diameter 8 µm or less in median diameter, thereafter mixing the individually primary pulverized raw materials in prescribed proportions, further pulverizing (secondary pulverizing) the same so as to make the mean particle diameter 6 µm or less in median diameter, and thereafter adding pure water of 3 wt. % to the mixed raw material and kneading the same (raw material mixing step); and the later steps similar to the steps of the method for producing a sintered body for a radiation shielding material in the method for producing a sintered body for a radiation shielding material according to the first aspect of the present invention.

In the present application, another method of sintering with an addition of a raw material containing $^{157}$Gd as a substance to exhibit shielding performance is devised. The "natural abundance ratio" of $^{157}$Gd in naturally occurring Gd is 15.65 atom %.

As a raw material containing $^{157}$Gd, for example, (all high-purity) gadolinium oxide ($Gd_2O_3$), gadolinium hydrate ($Gd(OH)_3$), or gadolinium fluoride ($GdF_3$) is used. Separately from the multicomponent system fluoride raw material, the gadolinium compound containing $^{157}$Gd is also pulverized to the same prescribed particle size as the multicomponent system fluoride raw material, and thereafter, added as $^{157}$Gd of 0.1-2 wt. % (that is, the gadolinium compound as $^{157}$Gd of 0.1-2 wt. % in terms of outer percentage is added to the multicomponent system fluoride raw material). They are mixed for a prescribed period of time, and further pulverized.

A prescribed quantity of pure water is added to this mixed raw material powder and kneaded for a prescribed period of time, resulting in a starting raw material.

The reason why the multicomponent system fluoride raw material and the gadolinium compound are separately pulverized once, and thereafter mixed and further pulverized, is because in the preliminarily conducted pulverizing tests of raw materials, it was confirmed that each raw material was differently pulverized.

Using the method for producing a sintered body for a radiation shielding material according to the third aspect of the present invention, since a high concentration of Gd (isotope $^{157}$Gd) having a larger absorption cross section to neutrons than Li is contained, a sintered body for a radiation shielding material having more excellent neutron shielding performance can be provided.

The method for producing a sintered body for a radiation shielding material according to a fourth aspect of the present invention is characterized by comprising the steps of:

pulverizing (primary pulverizing) individually a high-purity LiF raw material, one or more fluoride raw materials selected from among all high-purity $MgF_2$, $CaF_2$, $AlF_3$, KF, NaF, and/or $YF_3$, and a boron compound raw material selected from among all high-purity $B_2O_3$, $B(OH)_3$, $LiB_3O_5$ or $Li_2B_4O_7$, comprising a natural boron raw material and/or a boron raw material of enriched isotope $^{10}$B as a boron (B) source, and a gadolinium compound raw material selected from among all high-purity $Gd_2O_3$, $Gd(OH)_3$ or $GdF_3$, comprising a natural gadolinium raw material as a gadolinium (Gd) source, so as to make each mean particle diameter 8 µm or less in median diameter, thereafter mixing the individually primary pulverized raw materials in prescribed proportions, further pulverizing (secondary pulverizing) the same so as to make the mean particle diameter 6 µm or less in median diameter, and thereafter adding pure water of 3 wt. % to the mixed raw material and kneading the same (raw material mixing step); and the later steps similar to the steps of the method for producing a sintered body for a radiation shielding material in the method for producing a sintered body for a radiation shielding material according to the first aspect of the present invention.

Using the method for producing a sintered body for a radiation shielding material according to the fourth aspect of the present invention, since high concentrations of B (isotope $^{10}$B) and Gd (isotope $^{157}$Gd) each having a larger absorption cross section to neutrons than Li are contained, a sintered body for a radiation shielding material having more excellent neutron shielding performance can be provided.

The method for producing a sintered body for a radiation shielding material according to a fifth aspect of the present invention is characterized by adding the boron compound raw material as a boron isotope $^{10}$B in the outer percentage of 0.1-5 wt. % to the multicomponent system fluoride raw material consisting of LiF and other fluorides than LiF, in the method for producing a sintered body for a radiation shielding material according to the second or fourth aspect of the present invention.

Using the method for producing a sintered body for a radiation shielding material according to the fifth aspect of the present invention, a sintered body for a radiation shielding material having more excellent neutron shielding performance can be provided stably at a low cost.

The method for producing a sintered body for a radiation shielding material according to a sixth aspect of the present invention is characterized by adding the gadolinium compound raw material as a gadolinium isotope $^{157}$Gd in the natural gadolinium raw material in the outer percentage of 0.1-2 wt. % to the multicomponent system fluoride raw material consisting of LiF and other fluorides than LiF, in the method for producing a sintered body for a radiation shielding material according to the third or fourth aspect of the present invention.

Using the method for producing a sintered body for a radiation shielding material according to the sixth aspect of the present invention, a sintered body for a radiation shielding material having more excellent neutron shielding performance can be provided stably at a low cost.

The method for producing a sintered body for a radiation shielding material according to a seventh aspect of the present invention is characterized by further comprising, after the secondary sintering step in the method for producing a sintered body for a radiation shielding material according to the first aspect of the present invention, the step of hot press molding in a temperature range of 450° C.-700° C. at a uniaxial molding pressure of 0.05 MPa or more in a vacuum or at atmospheric pressure in an inert gas atmosphere (hot press step).

When the sintering is conducted by the pressure method from the beginning, the proceeding degree of sintering greatly differs in each portion of the sintered body (for example, the proceeding degree of the outer regions of the block-formed material is the highest, while that of the inside thereof is the lowest). When a fixed press force is applied to each portion of the sintered body in such a state, it causes the occurrence of large residual stress.

On the other hand, in the case of a homogeneous sintered body once sintered by the atmospheric pressure sintering method, even when the pressure sintering is conducted thereon thereafter, large residual stress is not caused within the sintered body, though a little stress may be caused therein, differently from the case of the pressure sintering from the beginning.

This is a great advantage of the case where the pressure sintering is conducted after the atmospheric pressure sintering is once conducted.

Using the method for producing a sintered body for a radiation shielding material according to the seventh aspect of the present invention, an excellent sintered body for a radiation shielding material having higher homogeneity, less unevenness in density, and extremely small residual stress, leading to the enhanced machining strength, can be provided. And a sintered body for a radiation shielding material which is adaptable to the products having various sizes and various forms, can be provided.

The method for producing a sintered body for a radiation shielding material according to an eighth aspect of the present invention is characterized by the radiation being a neutron beam in the method for producing a sintered body for a radiation shielding material according to any one of the first to seventh aspects of the present invention.

Using the method for producing a sintered body for a radiation shielding material according to the eighth aspect of the present invention, an excellent shielding material to radiation, particularly low-energy neutrons can be provided.

A method for producing a radiation shielding material according to a first aspect of the present invention is characterized by forming a radiation shielding material by further machining the sintered body for a radiation shielding material produced by the method for producing a sintered body for a radiation shielding material according to any one of the first to eighth aspects of the present invention.

Using the method for producing a radiation shielding material according to the first aspect of the present invention, radiation shielding materials having various sizes and desired forms can be easily provided.

BRIEF DESCRIPTION OF DRAWINGS

FIG. 8 is a list showing the raw materials and sintering conditions in Examples and Comparative Examples, and the evaluation results such as the physical properties, machining strength, and neutron shielding performance of the sintered bodies therein.

DESCRIPTION OF EMBODIMENTS

The preferred embodiment of the sintered body for a radiation shielding material, the radiation shielding material, and the method for producing the same according to the present invention is described below by reference to the Figures.

In order to produce a sintered body for a radiation shielding material according to the preferred embodiment, its raw material is a multicomponent system fluoride containing LiF, and/or a multicomponent system fluoride to which a boron compound containing $^{10}$B is added, and/or a multicomponent system fluoride to which a gadolinium compound containing $^{157}$Gd is added.

In order to produce the sintered body for a radiation shielding material according to the preferred embodiment, as raw materials, a high-purity (purity of 98.5 wt. % or more) LiF powder, and one or more fluoride powders selected from among all high-purity (purity of 99.9 wt. % or more) MgF$_2$, CaF$_2$, AlF$_3$, KF, NaF, and/or YF$_3$, are taken by a prescribed quantity.

The grinding of a raw material is conducted by a method wherein balls made of alumina (φ5 mm: 1800 g, φ10 mm: 1700 g, φ20 mm: 3000 g, and φ30 mm: 2800 g) are filled in a pot mill made of alumina (inside diameter of 280 mm and length of 400 mm) as a ball mill, and 3000 g of the raw material to be pulverized is filled therein and rotated for a prescribed period of time to be ground.

As other grinding methods, for example, the "medium agitation type pulverization method" referred to as "bead milling method" or "dynamic milling method", wherein a medium made of alumina or else is agitated with a raw material to be ground so as to pulverize it, may be used.

Figure 4:
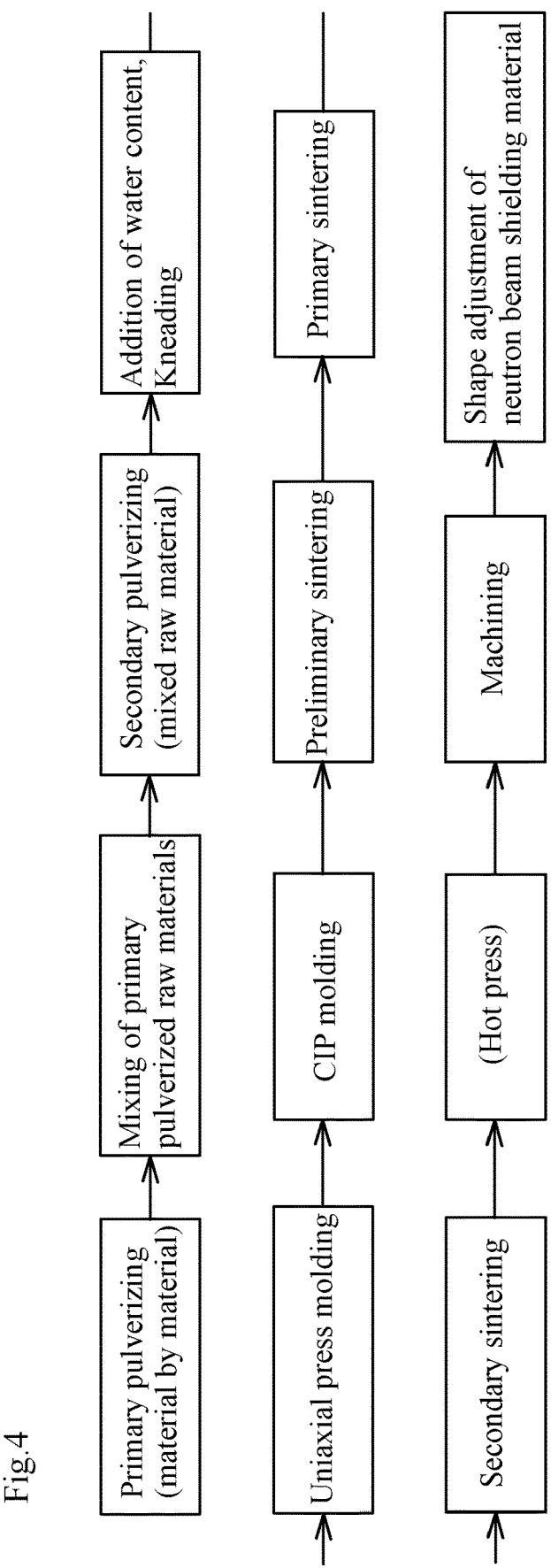
FIG. 4 is a flowchart showing the producing steps in the case of various fluoride raw materials with a boron-based raw material or a gadolinium-based raw material further added thereto.

The step flow in the case of a boron compound added to this multicomponent system fluoride is shown in FIG. 4.

The boron compound is selected from among high-purity (purity of 99.5 wt. % or more) B$_2$O$_3$, B(OH)$_3$, LiB$_3$O$_5$, or Li$_2$B$_4$O$_7$ and used. And the boron source is natural boron, and/or the enriched type of isotope $^{10}$B of natural boron.

The multicomponent system fluoride raw material and the boron compound raw material to be added thereto are separately pulverized by the below-described grinding method for two weeks (primary pulverizing), and thereafter, each of them is taken by a prescribed quantity, and they are mixed a whole day and night using a V-type mixer.

The mixed raw material is pulverized by the below-described grinding method for another week (secondary pulverizing).

The mean particle diameter of every kind of raw materials after separately pulverized for two weeks was a median diameter of 8 μm or less.

The mean particle diameter thereof after mixed and pulverized for another week was a median diameter of 6 μm or less.

The step flow in the case of a gadolinium compound added to the multicomponent system fluoride is shown in FIG. 4, as in the case of the boron compound addition.

The gadolinium compound is selected from among high-purity (purity of 99.9 wt. % or more) $Gd_2O_3$, $Gd(OH)_3$, or $GdF_3$ and used. And the gadolinium source is natural gadolinium.

As in the case of the boron compound addition, the multicomponent system fluoride raw material and the gadolinium compound raw material to be added thereto are separately pulverized by the below-described grinding method for two weeks (primary pulverizing), and thereafter, each of them is taken by a prescribed quantity, and they are mixed a whole day and night using a V-type mixer.

The mixed raw material is pulverized by the below-described grinding method for another week (secondary pulverizing).

Pure water of 3 wt. % is added to these pulverized raw materials, and kneaded for 12 hours using a kneading device. This is used as a starting raw material (raw material mixing step).

The reason why pure water is added to the secondary pulverized mixed raw material is to keep the shape of a molded body in the later steps, in and between the uniaxial press molding step and CIP molding step.

In order to keep the shape thereof, generally, a sintering aid is often used. However, when the sintering aid remains after sintering, it becomes an impurity, having a possibility of substantially affecting the neutron shielding performance. Consequently, pure water is used here.

It was found out from the preliminary test that the range of the quantity of pure water addition appropriate to shape keeping was 1 wt. % or more and 5 wt. % or less. It was also found out that the range of 2 wt. % or more and 4 wt. % or less was more preferable.

The starting raw material is filled into a wooden mold, and molded at a molding pressure of 5 MPa or more, preferably 20 MPa or more, using a hydraulic uniaxial press molding device (uniaxial press molding step).

The reason why the uniaxial press molding is conducted is to enable the molded body to keep its shape on the way to the next CIP step and in the next CIP step.

Here, by making the mold used in this uniaxial press molding step and a press plate for applying press pressure from the above in the shape of a rectangle, a round, a ring and the like in a plan view, the molded body can be made in each of the shapes in a plan view.

In addition, for example, by making them in the shape of a ring in a plan view and a lateral concave in a cross-sectional view, it is possible to make a sintered body in the shape of a ring in a plan view, being thinner on the inside diameter side while thicker on the outside diameter side in a cross-sectional view, which is suitable for filling the gap between the affected part of the patient and the beam emitting port of the BNCT apparatus.

The press molded article is put into a vinyl bag, which is sealed, and after letting the air within the vinyl bag out of it by suction, it is sealed again. Thereafter, the press molded article within the vinyl bag is set in a sample loading part of the cold isostatic pressing (CIP) device, the sample loading part is closed and sealed, and then, the space between the sample loading part and the press molded article in the vinyl bag is filled with clean water.

Thereafter, molding is conducted by applying a molding pressure of 5 MPa or more, preferably a hydraulic pressure of 20 MPa or more, to the filled clean water (that is, by pressing the sample through the vinyl). This makes it possible to keep the shape of the press molded article between and in the later steps (CIP molding step).

The preliminary sintering is conducted by heating the CIP molded article in an air atmosphere, in a temperature range of 350° C.-470° C. (preliminary sintering step).

In this preliminary sintering step, the vaporization and evaporation of mainly a water content contained in the initial raw material and the added pure water, and a solid phase reaction between raw material particles are promoted.

The reason why the above temperature range is selected is because in the case of the heating at a temperature below 350° C., the vaporization and evaporation of the above water content becomes too slow, while in the case of the heating at a temperature above 470° C., the solid phase reaction becomes too fast, resulting in insufficient vaporization and evaporation of water content.

Then, the preliminary sintered body is sintered by heating at atmospheric pressure in an air atmosphere or at atmospheric pressure in an inert gas atmosphere, in a temperature range of 480° C.-560° C. (primary sintering step).

The solid phase reaction is promoted by heating at 480° C. or higher, while the sublimation reaction of the raw material is restrained by heating at 560° C. or lower.

Consecutively (that means "without once cooling, heating is continued"), by heating at atmospheric pressure in the same atmosphere as in the preceding step, in a temperature range of 570° C.-800° C., a sintered body is formed (secondary sintering step).

By selecting this temperature range, the solid solution is formed, and excessive sintering reaction is restrained.

As necessary, after the secondary sintering step, the sintered body (i.e., the sintered body obtained by the atmospheric pressure sintering) is press molded at a molding pressure of 0.05 MPa or more with heating in a vacuum or in an inert gas atmosphere, in a temperature range of 450° C.-700° C. (hot press step).

The reason why the heating temperature range of 450° C.-700° C. is selected in this hot press step is because in the case of heating at a temperature below 450° C., since the viscosity of the sintered body becomes too high, leading to a slow viscous flow, hot forming cannot be smoothly carried out, while in the case of heating at a temperature above 700° C., since the sintered body and the mold intensely react with each other, hot forming cannot be carried out.

The uniaxial molding pressure of 0.05 MPa or more is selected, in order to make the molding pressure appropriate to the viscous flow property of the sintered body in the above heating situation.

Furthermore, as necessary, machining is conducted on the sintered body (the sintered body obtained by the atmospheric pressure sintering, or the sintered body obtained by further conducting the hot press step on the same) (machining step).

The sintered body (the sintered body obtained by the atmospheric pressure sintering, or the sintered body obtained by further conducting the hot press step on the same, or the sintered bodies on which machining was conducted) is used as a neutron shielding material.

The specific uses of a neutron shielding material consisting of this sintered body as a single item are the above-described first use (for leakage prevention of neutrons from the outer regions of the moderation system) and the third use (for prevention of malfunction and breakdown of the control devices in the periphery of the radiation generator).

[Small-Size Sintering Test]

In advance of the below-described Examples, as a preliminary test, concerning a small-size sintered body the rough size of a diameter of 75 mm and a thickness of 60 mm, the evaluation of neutron shielding performance by the below-described Monte Carlo transport analysis was conducted.

The reason why the sintered body in the small-size sintering test has the rough size of a diameter of 75 mm and a thickness of 60 mm, is because, when making this size larger (generally called "scale-up"), it was grabbed from a previously conducted test that the sintering test result thereof was closely related to this small-size sintering test result.

From this evaluation result, it turned out that the thermal neutron shielding performance of the sintered body whose component system was a LiF-MaF$_2$—CaF$_2$ ternary system with a boron compound or a gadolinium compound added thereto was further improved, compared to the LiF-MaF$_2$—CaF$_2$ ternary system sintered body, resulting in extremely excellent shielding performance.

When adding a boron compound to this LiF-MaF$_2$—CaF$_2$ ternary system, the above-mentioned four boron compounds, that is, boron oxide $B_2O_3$, boric acid $B(OH)_3$, lithium borate $LiB_3O_5$ or lithium tetraborate $Li_2B_4O_7$, were individually added thereto by a fixed quantity, and sintered bodies were produced with varying sintering temperatures in a temperature range of 400° C.-800° C. The maximum values of relative densities of these sintered bodies and the sintering temperatures at which the maximum values thereof could be obtained were examined.

As a result, the maximum values of relative densities are $Li_2B_4O_7 \approx LiB_3O_5 > B_2O_3 \approx B(OH)_3$ in decreasing order.

And it turned out that the most suitable boron compound to be added to this LiF—MgF$_2$—CaF$_2$ ternary system was $Li_2B_4O_7$.

Figure 5:
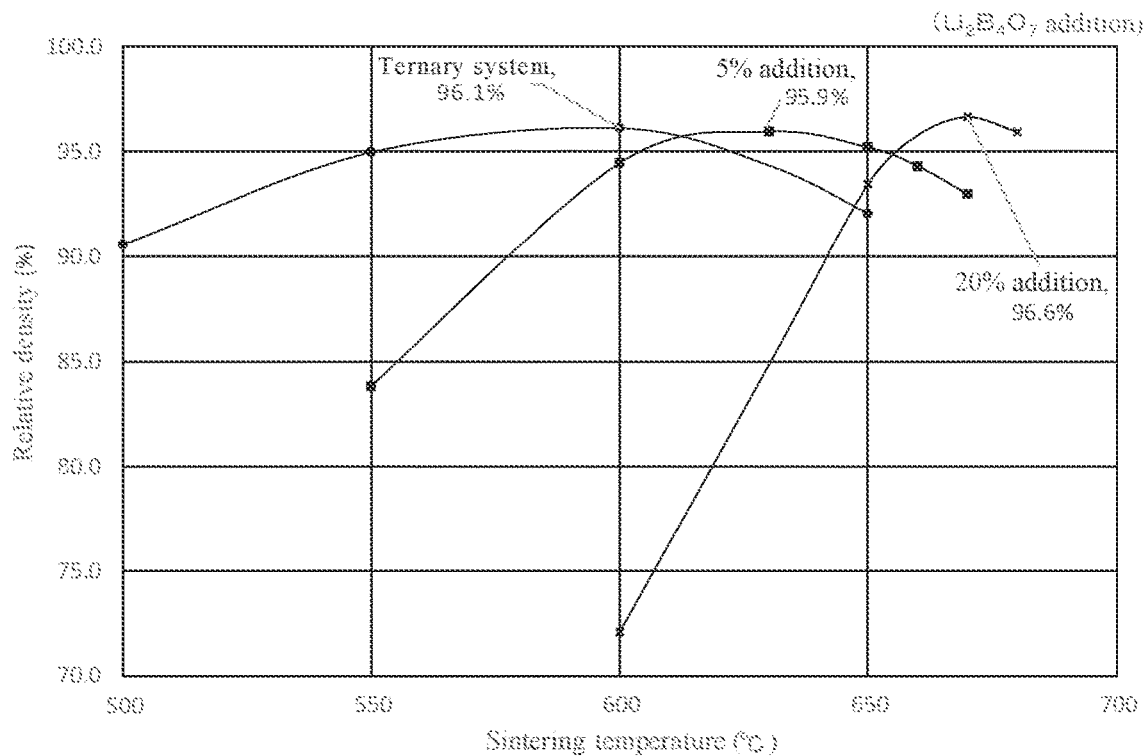
FIG. 5 is a graph showing the results of small-size sintering tests conducted by adopting Li$_2$B$_4$O$_7$ as a boron compound to be added to the LiF—MgF$_2$—CaF$_2$ ternary system.

As shown in FIG. 5, it was found that the sintered body with the addition of $Li_2B_4O_7$ had as good a relative density as the high-density ternary system.

Thus, it was found that the most suitable boron-based additives were $Li_2B_4O_7$ and $LiB_3O_5$, and that next to them, the other boron compounds including $B_2O_3$ were suitable.

It was anticipated what causes the difference in sintering property (specifically, relative density) of the sintered bodies between the two lithium borate-based boron compounds and the other two boron compounds was that since the melting points of the lithium borate-based boron compounds are about 900° C., higher than the sintering temperature, no vaporization/decomposition occurred in the sintering process, while the melting points of boron oxide $B_2O_3$ and boric acid $B(OH)_3$ are low, so that vaporization/decomposition easily occurred.

Naturally, the quantity of Li element in the ternary system which is a source of shielding performance is thinned by adding a boron compound in accordance with its addition ratio, and the shielding performance originating in Li is lowered for that. However, it is anticipated that in the case of the sintered body with the addition of $Li_2B_4O_7$, "Li element is added" thereto, resulting from the Li element originating in $Li_2B_4O_7$, so that it has an advantage in the shielding performance.

Likewise, in the case of adding a gadolinium compound to the LiF—MgF$_2$—CaF$_2$ ternary system, the above-mentioned three gadolinium compounds, such as $Gd_2O_3$, $Gd(OH)_3$, or $GdF_3$ were individually added thereto by a fixed quantity, and small-size tests were conducted in the similar manner to the above.

Figure 6:
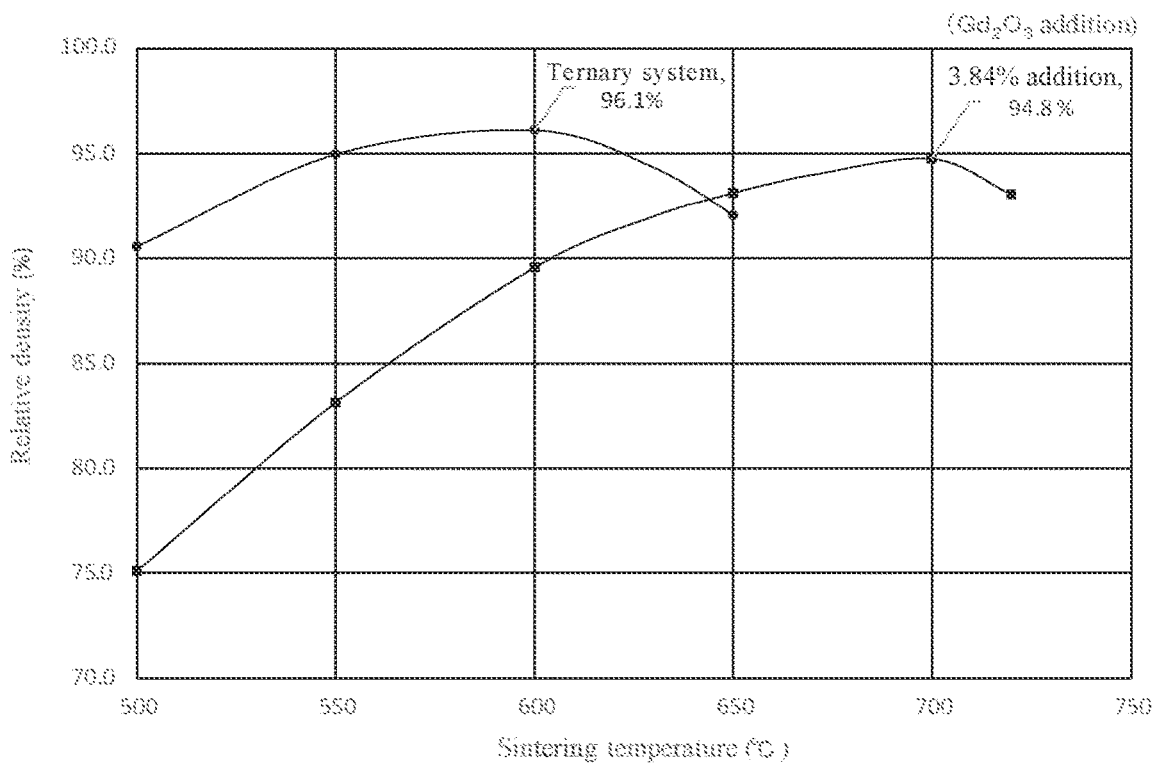
FIG. 6 is a graph showing the results of small-size sintering tests conducted by adopting Gd$_2$O$_3$ as a gadolinium compound to be added to the LiF—MgF$_2$—CaF$_2$ ternary system.

As an example of the results, the case of the addition of $Gd_2O_3$ is shown in FIG. 6.

By adding the gadolinium compound, a sintered body having as high a density as the ternary system could be obtained, which presented a good sintering property. And there was no clear difference in relative density according to the individual addition of different compounds.

On the basis of the results of such preliminary small-size sintering tests regarding the cases of the LiF—MgF$_2$—CaF$_2$ ternary system, and the cases of the ternary system with a boron compound or a gadolinium compound added thereto, Examples were conducted using a large-size apparatus.

EXAMPLES

The present invention is more specifically explained by reference to Examples below, but these Examples are just examples and the present invention is not limited to these Examples.

Various property evaluation tests were conducted using samples taken from the sintered bodies. The sintering conditions of the sintered bodies and the property evaluation test results thereof are shown in FIG. 8.

Here, how to conduct the property evaluation tests of a sintered body is described.

As evaluation indexes of machining strength, bending strength and Vickers hardness were adopted.

The sample for bending strength was prepared according to JIS C2141. The size of the sample was 4 mm×46 mm×t3 mm, and the upper and lower surfaces thereof were optically polished. And on the prepared sample, the three-point bending test was conducted according to JIS R1601.

To obtain the Vickers hardness, using "Micro Hardness Tester" made by Shimadzu Corporation, an indenter having a load of 100 g was pressed for 5 seconds of loading time so as to measure the diagonal length of the impression, which was converted into hardness as described below.

$$\text{Hardness} = 0.18909 \times P/(d)^2$$

Here, P: load (N) and d: diagonal length of impression (mm)

Figure 1:
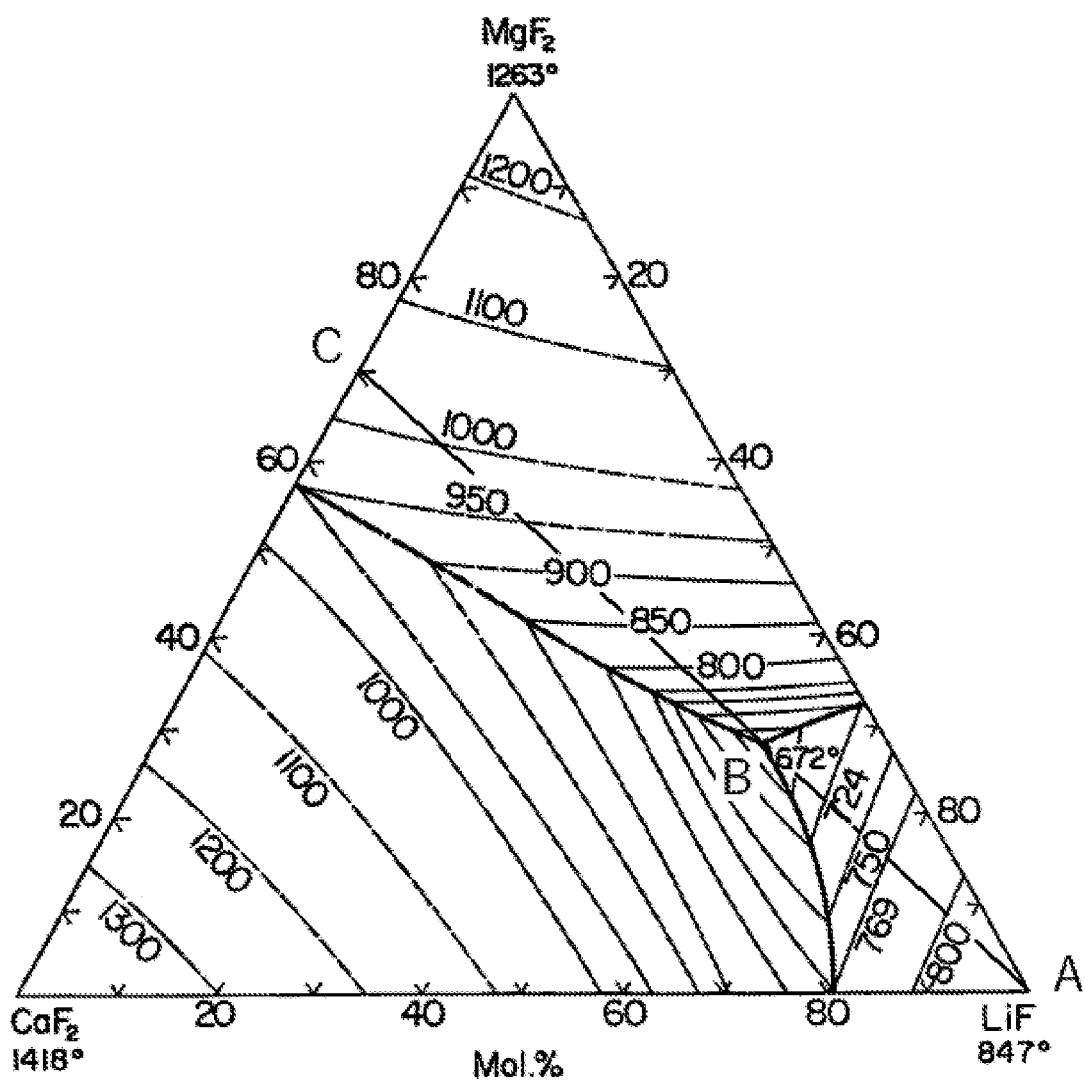
FIG. 1 is a diagram showing the equilibrium of LiF—MgF$_2$—CaF$_2$ ternary system and an example of the mix proportions in the ternary system raw material.
Figure 2:
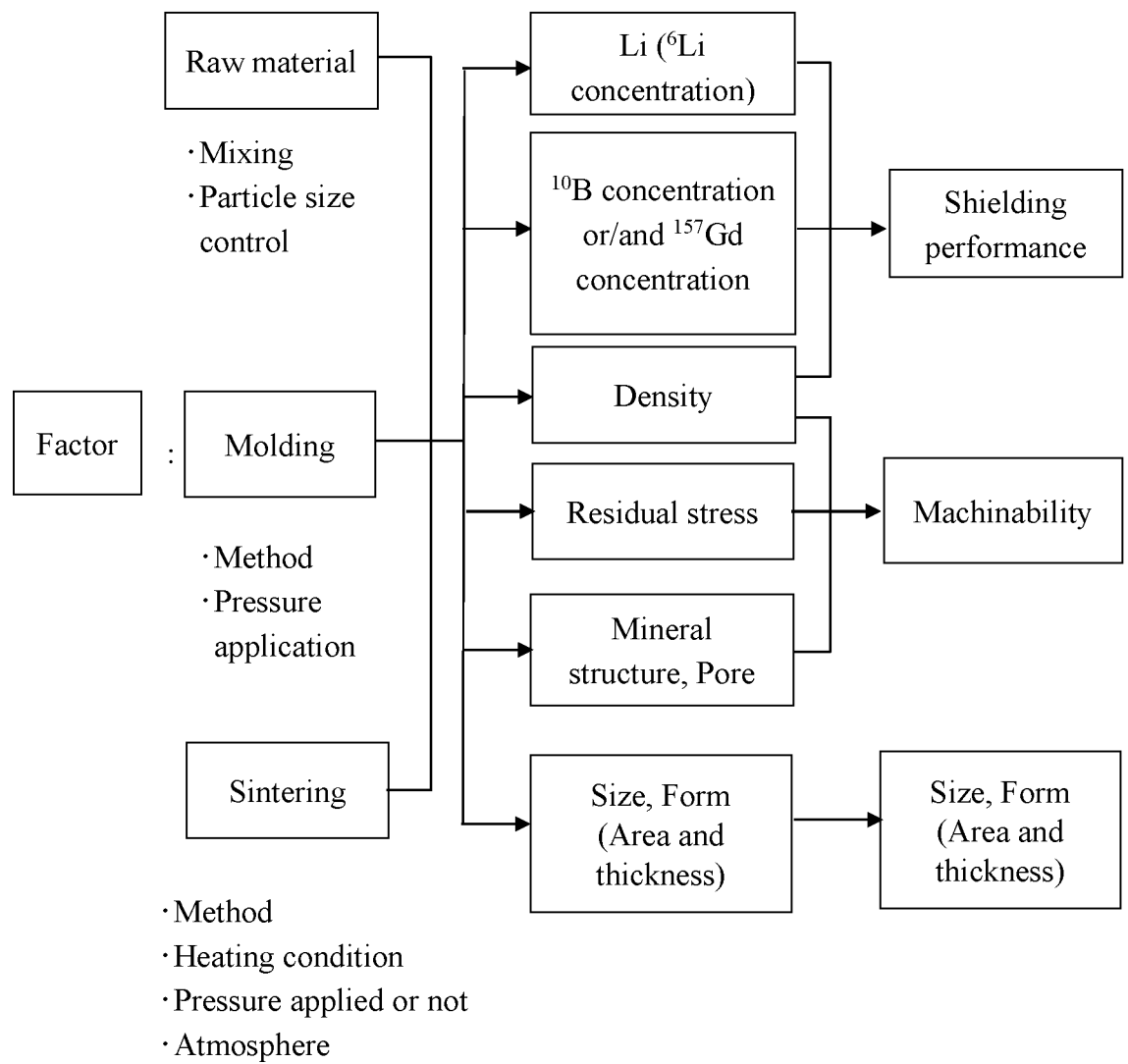
FIG. 2 is a factor analysis diagram wherein the relationship between the producing steps of a sintered body for a shielding material and the performance of the product is analyzed.
Figure 3:
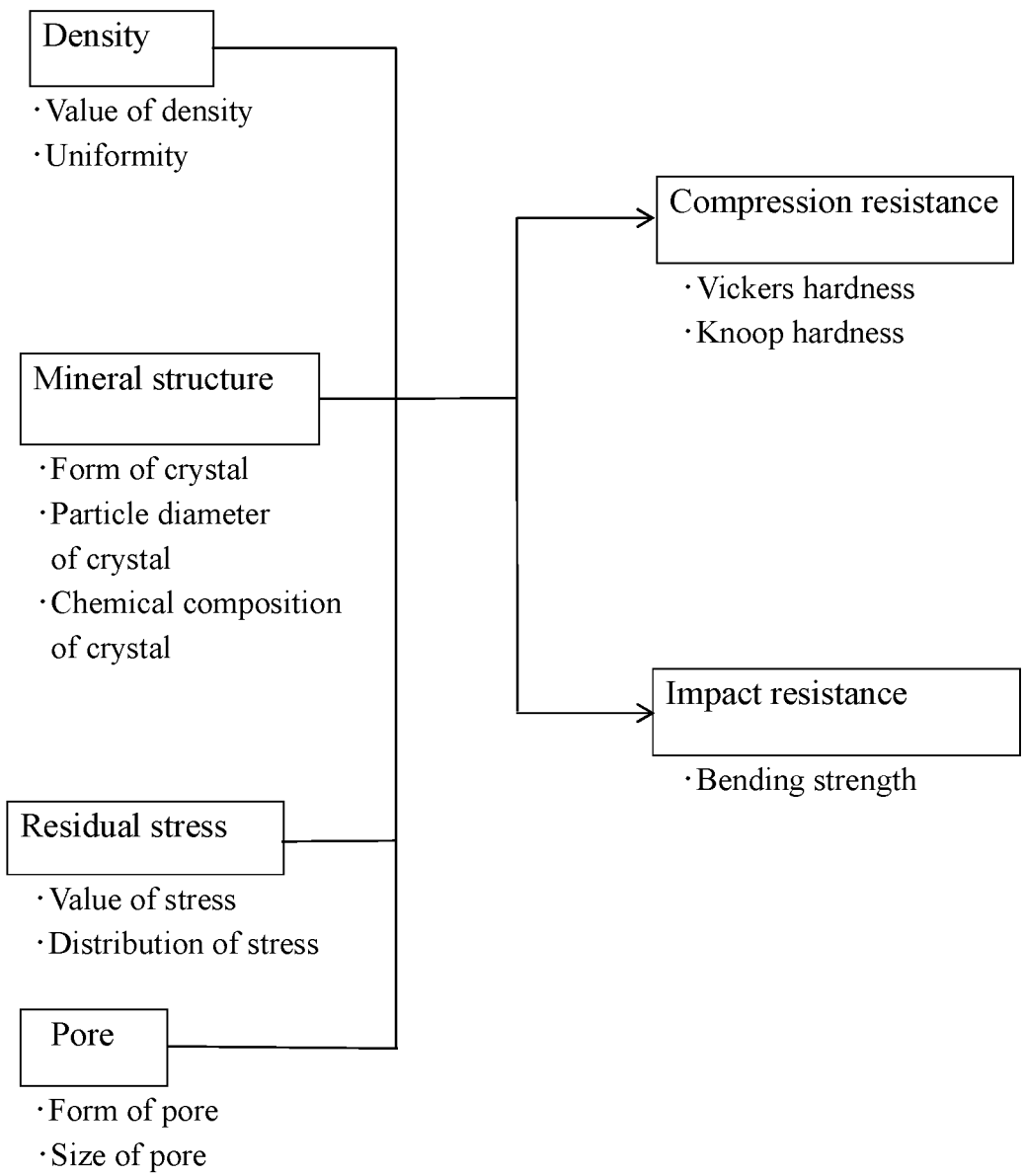
FIG. 3 is a relation diagram showing the relationship between the physical properties of the sintered body and the physicochemical factors to affect machining.

The bending strength and Vickers hardness of a sintered body are not decided depending on only the density (i.e., relative density) thereof, but they are decided, concretely, depending on factors such as "a mineral structure", "residual stress", and "bubbles" in addition to the "density", as shown in FIG. 3.

Therefore, different component systems have different numerical limits of bending strength and Vickers hardness. Here, the former consists of fluoride-based compounds of one kind, while the latter is a mixture system consisting of fluorides and another compound. The former mixture of fluoride-based compounds of one kind has a tendency to have higher machining strength than the latter.

As to the evaluation of shielding performance, hitherto, in the development team related to the BNCT, the design/manufacturing of a neutron generator and the evaluation of shielding performance of facilities are conducted by the Monte Carlo transport analysis using particle and heavy ion transport code system (referred to as "PHITS") described in the Non-Patent Document 6.

The evaluation of neutron shielding performance regarding the sintered bodies were conducted by the same analysis method.

Figure 7:
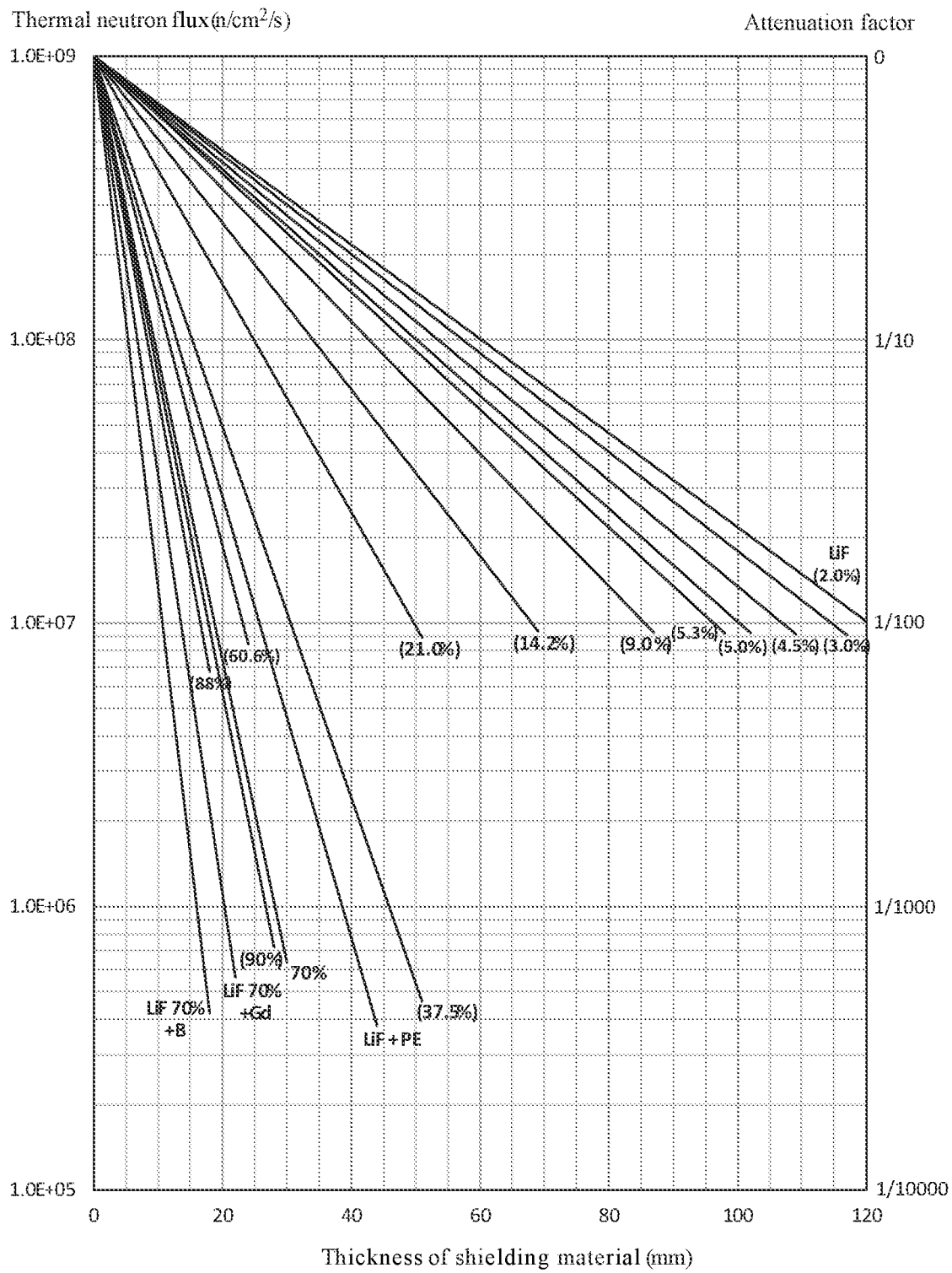
FIG. 7 is a graph showing the results of the simulation concerning the shielding performance of shielding materials obtained by machining each of the sintered bodies obtained by the small-size sintering tests.

The results of simulation regarding the shielding performance of each sintered body obtained in the above small-size sintering tests are shown in FIG. 7.

Specifically, the composition/components of the sintered body and the characteristic values such as relative density thereof are input, with changing the thickness thereof after machining, that is, the thickness of the neutron shielding material, an irradiation beam comprising mainly thermal neutrons (the thermal neutron flux at its incident point of the sintered body is 1.0E+09: constant) is injected into the sintered body and is compared to the thermal neutron flux at its outgoing point after transmittance ([outgoing thermal neutron flux]/[incident thermal neutron flux]=[thermal neutron attenuation factor]). The thinner the thickness (in mm) of the sintered body which leads to the thermal neutron attenuation factor (1/100) required as a shielding material is, the higher the shielding performance thereof is.

As to the upper limit of the thickness of the sintered body, as described in the section [Solution to Problem and Advantageous Effect of Invention], "It was judged that in the case of a sintered body for prevention of leakage radiation through a gap between a therapeutic beam irradiation port and an affected part of a patient, for example, the thickness thereof was preferably 100 mm or less as the upper limit thereof as a structural restriction of the BNCT apparatus, since it was admitted that when the distance from the irradiation port exceeded 100 mm, the therapeutic beam lost much energy.

However, in the case of a shielding material for leakage prevention of leakage radiation from the outer regions of the moderation system, the thickness which makes it possible to obtain the required shielding performance is strictly required, with no upper limit of the thickness of the shielding material." However, based on the premise that it is used in the vicinity of the affected part of the patient, the upper limit of the thickness thereof is 100 mm.

Consequently, the required shielding performance (here, the thickness (in mm) of the sintered body leading to the thermal neutron attenuation factor of 1/100) is limited to 100 mm or less.

As shown in the below-described Examples and Comparative Examples, the shielding performance (that is, the thickness of the sintered body leading to the thermal neutron attenuation factor of 1/100) in the case where the component system is the $LiF$—$MgF_2$—$CaF_2$ ternary system and the mixing ratio of LiF is 5 wt. %, is just 100 mm Therefore, the mixing ratio of LiF is required to be 5 wt. % or more.

The "total evaluation (⊚: excellent, ○: good, Δ: imperfect, x: failure)" of each sintered body shown in FIG. 8, was obtained by totally evaluating the sintered body based on the results of density and machining strength thereof and the results of simulation calculation.

The sintered bodies having the component system of the $LiF$—$MgF_2$—$CaF_2$ ternary system and the mixing ratio of LiF of 50 wt. % or more in Examples, have high thermal neutron shielding performance (the thickness of the shielding material leading to the thermal neutron attenuation factor of 1/100 is small), compared to the mixture of "polyethylene of 50 wt. % with a LiF powder of 50 wt. % (hereinafter, abbreviated as "LiF+PE" (comparative material)) which is evaluated to have the most excellent neutron shielding performance in the shielding material items on the market. They have extremely excellent shielding performance.

Example 1

As raw materials, high-purity LiF (using naturally occurring LiF): 98.8 wt. %, $MgF_2$: 0.8 wt. %, and $CaF_2$: 0.4 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 420 mm×420 mm×t150 mm), and compressed and molded at a uniaxial press pressure of 20 MPa using a uniaxial press device.

This press molded body (size: about 420 mm×420 mm×t90 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 406 mm×406 mm×t85 mm).

This CIP molded body was put into a preliminary sintering furnace, and preliminary sintering was conducted thereon at 400° C. for 6 hours in an air atmosphere, resulting in a preliminary sintered body the size of about 389 mm×389 mm×t81 mm.

This preliminary sintered body was put into a sintering furnace and heated from room temperature to 490° C. at a fixed rate for 6 hours in a nitrogen gas atmosphere, and the temperature was held there for 6 hours (primary sintering). And it was consecutively raised to 610° C. at a fixed rate for 6 hours and held there for 6 hours (secondary sintering). Heating was then stopped and the temperature was lowered to 100° C. by self-cooling (cooling time is about a whole day and night). Thereafter, the sintered body was taken out of the sintering furnace. The sintering state was good and the rough size thereof was 363 mm×363 mm×t76 mm.

Hereinafter, the pressure condition of gas atmosphere was set to be "atmospheric pressure" in any of the preliminary, primary, and secondary sintering steps in Examples and Comparative Examples.

The bulk density of the sintered body was calculated at 2.514 g/cm³ from the rough size and weight thereof. The relative density thereof was 95.0% since the true density calculated from the composition ratio was 2.646 g/cm³.

The "bulk density" here was obtained by a method wherein, since the appearance of the sintered body was a square in a plan view, the bulk volume was calculated from the measured two sides and thickness of the square, and the weight separately measured was divided by the bulk volume. This method was adopted likewise below.

Using samples taken from this sintered body, various property evaluation tests were conducted.

The results are shown in FIG. 8.

As described above, the shielding performance required of a sintered body for a shielding material (here, the thickness (in mm) of the sintered body leading to the thermal neutron attenuation factor of 1/100) is 100 mm or less, while the shielding performance of this example was 15 mm.

Considering that the shielding performance of a mixture of "a LiF powder of 50 wt. % with polyethylene of 50 wt. % (hereinafter, abbreviated as "LiF+PE") which is evaluated to have the highest shielding performance in the currently used shielding materials is 25 mm, it is apparent that the shielding performance of this Example 1: 15 mm is "extremely excellent shielding performance". And the other physical properties thereof such as relative density and machining strength were also good.

Here, the precondition of the simulation calculation of the shielding performance of "LiF+PE": 25 mm is based on the hypothesis that the material has an ideal structure/construction as a shielding material, for example, a LiF powder is uniformly dispersed in polyethylene (resin) and the particle size distribution of the powder is uniform.

Usually, in the case of kneading a powder of an inorganic material such as LiF with such polyethylene resin, in order to disperse the powder more uniformly, a dispersant such as a surface-active agent is used. However, in this use for a shielding material, since impurity contamination is strictly prohibited, it cannot be used.

Therefore, it is easily analogized that the LiF powder is unevenly distributed without excellent homogenous dispersibility in the polyethylene resin. In the case of such uneven distribution thereof, it is anticipated that since the shielding performance locally varies, the total shielding performance is lowered.

Consequently, it can be said that there is a very high possibility that the actual value of shielding performance of "LiF+PE" may be larger than 25 mm mentioned here (the shielding performance thereof may be a little poorer).

Example 2

As raw materials, high-purity LiF (using naturally occurring LiF): 90.0 wt. %, $MgF_2$: 6.3 wt. %, and $CaF_2$: 3.7 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t95 mm).

This CIP molded body was put into a preliminary sintering furnace, and preliminary sintering was conducted thereon at 400° C. for 6 hours in an air atmosphere, resulting in a preliminary sintered body the size of about 275 mm×275 mm×t89 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 620° C. at a fixed rate for 6 hours and held there for 6 hours (secondary sintering). Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The bulk density of the sintered body was calculated at 2.584 $g/cm^3$. The relative density thereof was 96.0% since the true density calculated from the composition ratio was 2.692 $g/cm^3$.

The shielding performance of the sintered body in this Example 2 was 16 mm, which was within specifications (100 mm or less) and was good in comparison with the comparative material "LiF+PE". The sintered body had excellent shielding performance, and also had good machining strength without problems.

Example 3

As raw materials, as in the case of Example 1, high-purity LiF (using naturally occurring LiF): 70.0 wt. %, $MgF_2$: 18.9 wt. %, and $CaF_2$: 11.1 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 289 mm×289 mm×t94 mm).

This CIP molded body was put into a preliminary sintering furnace, and preliminary sintering was conducted thereon at 400° C. for 6 hours in an air atmosphere, resulting in a preliminary sintered body the size of about 274 mm×274 mm×t88 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 620° C. at a fixed rate for 6 hours and held there for 6 hours (secondary sintering). Heating was then stopped and the temperature was lowered to 100° C. by self-cooling (cooling time is about a whole day and night). Thereafter, the sintered body was taken out of the sintering furnace. The sintering state was good and the rough size thereof was 259 mm×259 mm×t85 mm.

The relative density of the sintered body was calculated at 96.9%. And both the machining strength and neutron shielding performance thereof were good.

Example 4

As raw materials, as in the case of Example 1, high-purity LiF (using naturally occurring LiF): 21.0 wt. %, $MgF_2$: 49.8 wt. %, and $CaF_2$: 29.2 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 250 mm×250 mm×t180 mm), and compressed and molded at a uniaxial press pressure of 20 MPa using a uniaxial press device.

This press molded body (size: about 250 mm×250 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 242 mm×242 mm×t94.5 mm).

This CIP molded body was put into a preliminary sintering furnace, and preliminary sintering was conducted thereon at 400° C. for 6 hours in an air atmosphere, resulting in a preliminary sintered body the size of about 229 mm×229 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 620° C. at a fixed rate for 6 hours and held there for 6 hours (secondary sintering). Heating was then stopped and the temperature was lowered to 100° C. by self-cooling (cooling time is about a whole day and night). Thereafter, the sintered body was taken out of the sintering furnace. The sintering state was good and the rough size thereof was 217 mm×217 mm×t82 mm.

The relative density of the sintered body was calculated at 98.8%. And both the machining strength and neutron shielding performance thereof were good.

Example 5

As raw materials, as in the case of Example 1, high-purity LiF (using naturally occurring LiF): 9.0 wt. %, $MgF_2$: 57.3 wt. %, and $CaF_2$: 33.7 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 450 mm×450 mm×t130 mm), and compressed and molded at a uniaxial press pressure of 20 MPa using a uniaxial press device.

This press molded body (size: about 450 mm×450 mm×t60 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 431 mm×431 mm×t57.5 mm).

This CIP molded body was put into a preliminary sintering furnace, and preliminary sintering was conducted thereon at 410° C. for 6 hours in an air atmosphere, resulting in a preliminary sintered body the size of about 409 mm×409 mm×t54.5 mm.

This preliminary sintered body was put into a sintering furnace and heated from room temperature to 510° C. at a fixed rate for 6 hours in a nitrogen gas atmosphere, and the temperature was held there for 6 hours (primary sintering). And it was consecutively raised to 630° C. at a fixed rate for 6 hours and held there for 6 hours (secondary sintering). Heating was then stopped and the temperature was lowered to 100° C. by self-cooling (cooling time is about a whole day and night). Thereafter, the sintered body was taken out of the sintering furnace. The sintering state was good and the rough size thereof was 388 mm×388 mm×t49 mm.

The relative density of the sintered body was calculated at 97.2%. And both the machining strength and neutron shielding performance thereof were good.

Example 6

As raw materials, as in the case of Example 1, high-purity LiF (using naturally occurring LiF): 5.3 wt. %, $MgF_2$: 59.7 wt. %, and $CaF_2$: 35.0 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 420° C. for 6 hours in an air atmosphere, resulting in a preliminary sintered body the size of about 274 mm×275 mm×t90.5 mm.

This preliminary sintered body was put into a sintering furnace and heated from room temperature to 520° C. at a fixed rate for 6 hours in a nitrogen gas atmosphere, and the temperature was held there for 6 hours (primary sintering). And it was consecutively raised to 630° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 96.6%. And both the machining strength and neutron shielding performance thereof were good.

Example 7

As raw materials, as in the case of Example 1, high-purity LiF (using naturally occurring LiF): 70.0 wt. %, $MgF_2$: 18.9 wt. %, and $CaF_2$: 11.1 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold in the shape of a round in a plan view (mold size: φ550 mm×t180 mm), and compressed and molded at a uniaxial press pressure of 20 MPa using a uniaxial press device.

This press molded body (size: about φ550 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about φ531 mm×t94 mm).

This CIP molded body was put into a preliminary sintering furnace, and preliminary sintering was conducted thereon at 400° C. for 6 hours in an air atmosphere, resulting in a preliminary sintered body the size of about φ503 mm×t90 mm.

This preliminary sintered body was put into a sintering furnace and heated from room temperature to 480° C. at a fixed rate for 6 hours in a nitrogen gas atmosphere, and the temperature was held there for 6 hours (primary sintering). And it was consecutively raised to 610° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was φ77 mm×t83 mm.

The relative density of the disk-like sintered body was calculated at 95.6%. And both the machining strength and neutron shielding performance thereof were good.

Example 8

As raw materials, as in the case of Example 1, high-purity LiF (using naturally occurring LiF): 70.0 wt. %, $MgF_2$: 18.9 wt. %, and $CaF_2$: 11.1 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold in the shape of a ring in a plan view (mold size: outside φ350 mm×inside φ100 mm×t200 mm), and compressed and molded at a uniaxial press pressure of 20 MPa using a uniaxial press device.

This press molded body (size: about outside φ350 mm×inside φ100 mm×t120 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about outside φ337 mm×inside φ96 mm×t111 mm).

This CIP molded body was put into a preliminary sintering furnace, and preliminary sintering was conducted thereon at 400° C. for 6 hours in an air atmosphere, resulting in a preliminary sintered body the size of about outside φ317 mm×inside φ93 mm×t106 mm.

This preliminary sintered body was put into a sintering furnace and heated from room temperature to 500° C. at a fixed rate for 6 hours in an air atmosphere, and the temperature was held there for 6 hours (primary sintering). And it was consecutively raised to 610° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was outside φ300 mm×inside φ88 mm×t100 mm.

The relative density of the ring-shaped sintered body was calculated at 96.2%. And both the machining strength and neutron shielding performance thereof were good.

Example 9

As raw materials, as in the case of Example 1, high-purity LiF (using naturally occurring LiF): 70.0 wt. %, $MgF_2$: 18.9 wt. %, and $CaF_2$: 11.1 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 5.5 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 5.5 MPa, so as to form a CIP molded body (size: about 290 mm×290 mm×t94.5 mm).

This CIP molded body was put into a preliminary sintering furnace, and preliminary sintering was conducted thereon at 350° C. for 6 hours in an air atmosphere, resulting in a preliminary sintered body the size of about 274 mm×275 mm×t90.5 mm.

This preliminary sintered body was put into a sintering furnace and heated from room temperature to 480° C. at a fixed rate for 6 hours in a nitrogen gas atmosphere, and the temperature was held there for 6 hours (primary sintering). And it was consecutively raised to 580° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t83 mm.

The relative density of the sintered body after secondary sintering was 93.0%, which was higher than the specified relative density of 92%, but rather low.

Therefore, this sintered body was heated in a vacuum using a hot press device. With holding the temperature at 540° C. for 0.25 hour, a load of 0.05 MPa was applied thereto using a pressing press for hot forming. The load application was stopped, and then, the heating was stopped. After the temperature was lowered by furnace cooling to 100° C. or less which was a specified temperature to take out the work at, the sintered body was taken out.

The relative density of the sintered body after hot press was 98.9%, which was good. And both the machining strength and neutron shielding performance thereof were good.

Example 10

As raw materials, as in the case of Example 1, a multi-component system fluoride consisting of high-purity LiF (using naturally occurring LiF): 70.0 wt. %, $MgF_2$: 18.9 wt. %, and $CaF_2$: 11.1 wt. %, and a high-purity boric acid ($B(OH)_3$) in which an enriched type boron raw material obtained by enriching the isotope $^{10}$B to 96% was used as a boron compound, were individually pulverized for two weeks by the method using a ball mill described in the above Description of Embodiments. To the multicomponent system fluoride, the boron compound as the isotope $^{10}$B of 0.5 wt. % was added (the boric acid of 3.85 wt. % was added) and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 5.5 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 5.5 MPa, so as to form a CIP molded body (size: about 292 mm×292 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 610° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t84 mm.

The relative density of the sintered body after secondary sintering was 92.4%, which was higher than the specified relative density of 92%, but rather low.

Therefore, this sintered body was heated in a vacuum using a hot press device. With holding the temperature at 570° C. for 0.25 hour, a load of 0.10 MPa was applied thereto using a pressing press for hot forming. The load application was stopped, and then, the heating was stopped. After the temperature was lowered by furnace cooling to 100° C. or less which was a specified temperature to take out the work at, the sintered body was taken out.

The relative density of the sintered body after hot press was 99.4%, which was good. And both the machining strength and neutron shielding performance thereof were good.

Example 11

As raw materials, as in the case of Example 1, a multicomponent system fluoride consisting of high-purity LiF (using naturally occurring LiF): 70.0 wt. %, MgF$_2$: 18.9 wt. %, and CaF$_2$: 11.1 wt. %, and a high-purity lithium tetraborate (Li$_2$B$_4$O$_7$) being a natural boron raw material as a boron compound, were individually pulverized for two weeks by the method using a ball mill described in the above Description of Embodiments. To the multicomponent system fluoride, the boron compound as the isotope $^{10}$B of 1.0 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 640° C. at a fixed rate for 6 hours and held there for 10 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 95.6%. And both the machining strength and neutron shielding performance thereof were good.

Example 12

As raw materials, as in the case of Example 1, a multicomponent system fluoride consisting of high-purity LiF (using naturally occurring LiF): 70.0 wt. %, MgF$_2$: 18.9 wt. %, and CaF$_2$: 11.1 wt. %, and a high-purity gadolinium oxide (Gd$_2$O$_3$) being a natural gadolinium raw material as a gadolinium compound, were individually pulverized for two weeks by the method using a ball mill described in the above Description of Embodiments. To the multicomponent system fluoride, the gadolinium compound as the isotope $^{157}$Gd of 0.52 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 700° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 94.0%. And both the machining strength and neutron shielding performance thereof were good.

Example 13

As raw materials, as in the case of Example 1, a multicomponent system fluoride consisting of high-purity LiF (using naturally occurring LiF): 70.0 wt. %, $MgF_2$: 18.9 wt. %, and $CaF_2$: 11.1 wt. %, and a high-purity gadolinium oxide ($Gd_2O_3$) being a natural gadolinium raw material as a gadolinium compound, were individually pulverized for two weeks by the method using a ball mill described in the above Description of Embodiments. To the multicomponent system fluoride, the gadolinium compound as the isotope $^{157}Gd$ of 1.56 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 520° C. at a fixed rate for 6 hours in a nitrogen gas atmosphere, and the temperature was held there for 6 hours (primary sintering). And it was consecutively raised to 700° C. at a fixed rate for 6 hours and held there for 10 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 95.5%. And both the machining strength and neutron shielding performance thereof were good.

Example 14

As raw materials, as in the case of Example 1, high-purity LiF (using naturally occurring LiF): 5.3 wt. %, $MgF_2$: 59.7 wt. %, and $CaF_2$: 35.0 wt. %, a high-purity lithium tetraborate ($Li_2B_4O_7$) being a natural boron raw material as a boron compound, and a high-purity gadolinium oxide ($Gd_2O_3$) being a natural gadolinium raw material as a gadolinium compound, were individually pulverized for two weeks by the method using a ball mill described in the above Description of Embodiments. To the multicomponent system fluoride, the boron compound as the isotope $^{10}B$ of 1.5 wt. % was added, the gadolinium compound as the isotope $^{157}Gd$ of 0.52 wt. % was further added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 420° C. for 6 hours in an air atmosphere, resulting in a preliminary sintered body the size of about 274 mm×275 mm×t90.5 mm.

This preliminary sintered body was put into a sintering furnace and heated from room temperature to 520° C. at a fixed rate for 6 hours in a nitrogen gas atmosphere, and the temperature was held there for 6 hours (primary sintering). And it was consecutively raised to 700° C. at a fixed rate for 6 hours and held there for 10 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 94.3%. And both the machining strength and neutron shielding performance thereof were good.

Example 15

As raw materials, as in the case of Example 1, high-purity LiF (using naturally occurring LiF): 9.0 wt. %, $MgF_2$: 57.3 wt. %, and $CaF_2$: 33.7 wt. %, and a high-purity lithium tetraborate ($Li_2B_4O_7$) being a natural boron raw material as a boron compound, were individually pulverized for two weeks by the method using a ball mill described in the above Description of Embodiments. To the multicomponent system fluoride, the boron compound as the isotope $^{10}B$ of 1.5 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 420° C. for 6 hours in an air atmosphere, resulting in a preliminary sintered body the size of about 274 mm×275 mm×t90.5 mm.

This preliminary sintered body was put into a sintering furnace and heated from room temperature to 520° C. at a fixed rate for 6 hours in a nitrogen gas atmosphere, and the temperature was held there for 6 hours (primary sintering). And it was consecutively raised to 630° C. at a fixed rate for 6 hours and held there for 10 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 95.2%. And both the machining strength and neutron shielding performance thereof were good.

Example 16

As raw materials, as in the case of Example 1, high-purity LiF (using naturally occurring LiF): 9.0 wt. %, $MgF_2$: 57.3 wt. %, and $CaF_2$: 33.7 wt. %, and a high-purity gadolinium oxide ($Gd_2O_3$) being a natural gadolinium raw material as a gadolinium compound, were individually pulverized for two weeks by the method using a ball mill described in the above Description of Embodiments. To the multicomponent system fluoride, the gadolinium compound as the isotope $^{157}Gd$ of 0.52 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 420° C. for 6 hours in an air atmosphere, resulting in a preliminary sintered body the size of about 274 mm×275 mm×t90.5 mm.

This preliminary sintered body was put into a sintering furnace and heated from room temperature to 520° C. at a fixed rate for 6 hours in an air atmosphere, and the temperature was held there for 6 hours (primary sintering). And it was consecutively raised to 700° C. at a fixed rate for 6 hours and held there for 10 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t81 mm.

The relative density of the sintered body was calculated at 96.0%. And both the machining strength and neutron shielding performance thereof were good.

In the above Examples, no case wherein one or more fluorides selected from among $AlF_3$, KF, NaF, and/or $YF_3$ are used is exemplified, but the use of these fluorides is within the scope of the technical idea constituting the present invention likewise, since the fluorides can be easily arrived at by a person skilled in the art.

Comparative Example 1

As raw materials, as in the case of Example 1, high-purity LiF (using naturally occurring LiF): 3.0 wt. %, $MgF_2$: 61.1 wt. %, and $CaF_2$: 35.9 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 630° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t81 mm.

49

The relative density of the sintered body was calculated at 96.7%. The machining strength thereof was good, but the neutron shielding performance thereof was noticeably poor.

Comparative Example 2

As raw materials, as in the case of Example 1, high-purity LiF (using naturally occurring LiF): 4.5 wt. %, $MgF_2$: 60.2 wt. %, and $CaF_2$: 35.3 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 20 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 20 MPa, so as to form a CIP molded body (size: about 290 mm×290 mm×t94.5 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 500° C. at a fixed rate for 6 hours in a nitrogen gas atmosphere, and the temperature was held there for 6 hours (primary sintering). And it was consecutively raised to 625° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t81 mm.

The relative density of the sintered body was calculated at 97.0%. The machining strength thereof was good, but the neutron shielding performance thereof was noticeably poor.

Comparative Example 3

As raw materials, as in the case of Example 1, high-purity LiF (using naturally occurring LiF): 91.5 wt. %, $MgF_2$: 5.4 wt. %, and $CaF_2$: 3.1 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 5 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 5 MPa, so as to form a CIP molded body (size: about 290 mm×290 mm×t95 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 460° C. at a fixed rate for 6 hours in a nitrogen gas atmosphere, and the temperature was held there for 6 hours (primary sintering). And it was consecutively raised to 560° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 91.2%, which was lower than the specified value (92% or more). The neutron shielding performance thereof was good, but the machining strength thereof was noticeably poor.

Comparative Example 4

As a raw material, as in the case of Example 1, high-purity LiF (using naturally occurring LiF): 100 wt. % was pulverized by the method using a ball mill described in the above Description of Embodiments. To the pulverized raw material, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 4 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 4 MPa, so as to form a CIP molded body (size: about 290 mm×290 mm×t95 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 480° C. at a fixed rate for 6 hours in a nitrogen gas atmosphere, and the temperature was held there for 6 hours (primary sintering). And it was consecutively raised to 560° C. at a fixed rate for 4 hours and held there for 4 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 91.0%, which was lower than the specified value (92% or more). The neutron shielding performance thereof was good, but the machining strength thereof was noticeably poor.

Comparative Example 5

As raw materials, as in the case of Example 1, high-purity LiF (using naturally occurring LiF): 90.0 wt. %, $MgF_2$: 6.3 wt. %, and $CaF_2$: 3.7 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 4 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 4 MPa, so as to form a CIP molded body (size: about 290 mm×290 mm×t95 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t90.5 mm.

This preliminary sintered body was put into a sintering furnace and heated from room temperature to 450° C. at a fixed rate for 6 hours in a nitrogen gas atmosphere, and the temperature was held there for 6 hours (primary sintering). And it was consecutively raised to 550° C. at a fixed rate for 4 hours and held there for 4 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 90.2%, which was lower than the specified value (92% or more). The neutron shielding performance thereof was good, but the machining strength thereof was noticeably poor.

Comparative Example 6

As raw materials, as in the case of Example 1, high-purity LiF (using naturally occurring LiF): 90.0 wt. %, $MgF_2$: 6.3 wt. %, and $CaF_2$: 3.7 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 4 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 4 MPa, so as to form a CIP molded body (size: about 290 mm×290 mm×t95 mm).

This CIP molded body was put into a preliminary sintering furnace, and preliminary sintering was conducted thereon at 380° C. for 6 hours in an air atmosphere, resulting in a preliminary sintered body the size of about 274 mm×275 mm×t91 mm.

This preliminary sintered body was put into a sintering furnace and heated from room temperature to 460° C. at a fixed rate for 6 hours in a nitrogen gas atmosphere, and the temperature was held there for 6 hours (primary sintering). And it was consecutively raised to 570° C. at a fixed rate for 4 hours and held there for 4 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82.5 mm.

The relative density of the sintered body was calculated at 90.7%, which was lower than the specified value (92% or more). The neutron shielding performance thereof was good, but the machining strength thereof was noticeably poor.

Comparative Example 7

As raw materials, as in the case of Example 1, high-purity LiF (using naturally occurring LiF): 90.0 wt. %, $MgF_2$: 6.3 wt. %, and $CaF_2$: 3.7 wt. % were pulverized by the method using a ball mill described in the above Description of Embodiments. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 4 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 4 MPa, so as to form a CIP molded body (size: about 290 mm×290 mm×t95 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t91 mm.

This preliminary sintered body was put into a sintering furnace and heated from room temperature to 470° C. at a fixed rate for 6 hours in a nitrogen gas atmosphere, and the temperature was held there for 6 hours (primary sintering). And it was consecutively raised to 570° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 91.0%, which was lower than the specified value (92% or more). The neutron shielding performance thereof was good, but the machining strength thereof was noticeably poor.

Comparative Example 8

As raw materials, as in the case of Example 1, high-purity LiF (using naturally occurring LiF): 90.0 wt. %, $MgF_2$: 6.3 wt. %, and $CaF_2$: 3.7 wt. %, and a high-purity boric acid ($B(OH)_3$) in which an enriched type boron raw material obtained by enriching the isotope $^{10}B$ to 96% shown in the above Example 10 was used as a boron compound, were individually pulverized for two weeks by the method using a ball mill described in the above Description of Embodiments. To the multicomponent system fluoride, the boron compound as the isotope $^{10}B$ of 1.5 wt. % was added and mixed, and pulverized for another week. To the pulverized raw materials, pure water of 3 wt. % was added, and the same was kneaded so as to be a starting raw material.

This starting raw material was filled into a wooden mold (mold size: 300 mm×300 mm×t180 mm), and compressed and molded at a uniaxial press pressure of 3 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 3 MPa, so as to form a CIP molded body (size: about 292 mm×292 mm×t95 mm).

This CIP molded body was put into a preliminary sintering furnace, and preliminary sintering was conducted thereon at 400° C. for 6 hours in an air atmosphere, resulting in a preliminary sintered body the size of about 274 mm×275 mm×t91 mm.

This preliminary sintered body was put into a sintering furnace and heated from room temperature to 480° C. at a fixed rate for 6 hours in a nitrogen gas atmosphere, and the temperature was held there for 6 hours (primary sintering). And it was consecutively raised to 570° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t83 mm.

The relative density of the sintered body was calculated at 89.5%, which was lower than the specified value (92% or more). The neutron shielding performance thereof was good, but the machining strength thereof was noticeably poor.

Comparative Example 9

As raw materials, as in the case of Example 1, high-purity LiF (using naturally occurring LiF): 90.0 wt. %, $MgF_2$: 6.3 wt. %, and $CaF_2$: 3.7 wt. %, and a high-purity gadolinium oxide ($Gd_2O_3$) being a natural gadolinium raw material as a gadolinium compound, were individually pulverized for two weeks by the method using a ball mill described in the above Description of Embodiments. To the multicomponent system fluoride, the gadolinium compound as the isotope $^{157}Gd$ of 0.52 wt. % was added and mixed, and pulverized for another week. Pure water of 3 wt. % was added thereto, and the same was kneaded so as to be a starting raw material.

This starting raw material was filled into a wooden mold (mold size: 300 mm×300 mm×t180 mm), and compressed and molded at a uniaxial press pressure of 10 MPa using a uniaxial press device.

This press molded body (size: about 300 mm×300 mm×t100 mm), which was put into a thick vinyl bag, and sealed after deairing, was put into a molding part of a cold isostatic pressing (CIP) device.

Clean water was filled into the space between the vinyl bag with this press molded body therein and the molding part of the CIP device, isostatic pressing was applied to the clean water at a molding pressure of 10 MPa, so as to form a CIP molded body (size: about 290 mm×290 mm×t94.5 mm).

This CIP molded body was put into a preliminary sintering furnace, and preliminary sintering was conducted thereon at 390° C. for 6 hours in an air atmosphere, resulting in a preliminary sintered body the size of about 274 mm×275 mm×t90.5 mm.

This preliminary sintered body was put into a sintering furnace and heated from room temperature to 470° C. at a fixed rate for 6 hours in a nitrogen gas atmosphere, and the temperature was held there for 6 hours (primary sintering). And it was consecutively raised to 630° C. at a fixed rate for 6 hours and held there for 6 hours (secondary sintering).

Heating was then stopped and the temperature was lowered to 100° C. by self-cooling (cooling time is about a whole day and night). Thereafter, the sintered body was taken out of the sintering furnace. The sintering state was good and the rough size thereof was 260 mm×260 mm×t82 mm.

The relative density of the sintered body was calculated at 90.5%, which was lower than the specified value (92% or more). The neutron shielding performance thereof was good, but the machining strength thereof was noticeably poor.

The invention claimed is:

1. A sintered body for a radiation shielding material, comprising:
    over 95 wt. % to 99 wt. % of LiF, and
    1 wt. % to 5 wt. % of one or more fluorides selected from the group consisting of $MgF_2$, $CaF_2$, $AlF_3$, KF, NaF, and $YF_3$,
    wherein the sintered body has a relative density of over 92%,
    wherein the sintered body has a bending strength of 50 MPa or more, and
    wherein the sintered body has a Vickers hardness of 100 or more.

2. The sintered body for a radiation shielding material according to claim 1,
    wherein 0.1-5 wt. % of a boron compound selected from the group consisting of $B_2O_3$, $B(OH)_3$, $LiB_3O_5$, and $Li_2B_4O_7$ is further added as a boron isotope $^{10}B$, and/or wherein 0.1-2 wt. % of a gadolinium compound selected from the group consisting of $Gd_2O_3$, $Gd(OH)_3$, and $GdF_3$ is added as a gadolinium isotope $^{157}Gd$.

3. The sintered body for a radiation shielding material according to claim 1, wherein the radiation is a neutron beam.

4. The sintered body for a radiation shielding material according to claim 2, wherein the radiation is a neutron beam.

5. A radiation shielding material, which is formed by machining the sintered body for a radiation shielding material according to claim 1.

6. A radiation shielding material, which is formed by machining the sintered body for a radiation shielding material according to claim 2.

7. The radiation shielding material according to claim 5, wherein the shielding material formed by machining the sintered body has a thickness of 100 mm or less in a radiation irradiation field, has thermal neutron shielding performance expressed as a value obtained by dividing a thermal neutron flux outgoing from the shielding material (N1) by a thermal neutron flux incident on the shielding material (N0) that is a thermal neutron attenuation factor (N1/N0) of 1/100 or less.

8. The radiation shielding material according to claim 6, wherein the shielding material formed by machining the sintered body has a thickness of 100 mm or less in a radiation irradiation field, has thermal neutron shielding performance expressed as a value obtained by dividing a thermal neutron flux outgoing from the shielding material (N1) by a thermal neutron flux incident on the shielding material (N1) that is a thermal neutron attenuation factor (N1/N0) of 1/100 or less.

9. The sintered body for a radiation shielding material according to claim 1, wherein the one or more fluorides include both $MgF_2$ and $CaF_2$.

* * * * *